(12) United States Patent
Kim et al.

(10) Patent No.: US 12,322,202 B2
(45) Date of Patent: *Jun. 3, 2025

(54) DISPLAY DEVICE AND METHOD OF DRIVING THE SAME

(71) Applicant: Samsung Display Co., LTD., Yongin-si (KR)

(72) Inventors: Jong Tae Kim, Seoul (KR); Sang Wook Yoo, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/555,367

(22) Filed: Dec. 17, 2021

(65) Prior Publication Data

US 2022/0114828 A1    Apr. 14, 2022

Related U.S. Application Data

(63) Continuation of application No. 16/738,854, filed on Jan. 9, 2020, now Pat. No. 11,205,062.

(30) Foreign Application Priority Data

Mar. 11, 2019    (KR) .................. 10-2019-0027485

(51) Int. Cl.
*G06F 3/044*    (2006.01)
*G06F 3/01*    (2006.01)
(Continued)

(52) U.S. Cl.
CPC .......... *G06V 40/1306* (2022.01); *G06F 3/016* (2013.01); *G06F 3/0412* (2013.01);
(Continued)

(58) Field of Classification Search
CPC ... G06V 40/1306; G06F 3/016; G06F 3/0412; G06F 21/32; G06F 3/044; H01L 41/083; H01L 41/09; H05K 1/189; G01S 7/52079
See application file for complete search history.

(56) References Cited

U.S. PATENT DOCUMENTS

2014/0176332 A1    6/2014    Alameh et al.
2014/0333553 A1    11/2014    Yun et al.
(Continued)

FOREIGN PATENT DOCUMENTS

CN    107609539 A    1/2018
CN    108573214 A    9/2018
(Continued)

OTHER PUBLICATIONS

Non-Final Office Action dated Feb. 25, 2021 in KSA0522US.
(Continued)

*Primary Examiner* — Abdul-Samad A Adediran
(74) *Attorney, Agent, or Firm* — CANTOR COLBURN LLP

(57) ABSTRACT

A display device includes: a display panel; a fingerprint sensor which is disposed on a surface of the display panel and senses a user's fingerprint by emitting ultrasonic waves; and a first vibrator which is disposed on a surface of the fingerprint sensor and generates vibrations based on driving voltages applied thereto.

18 Claims, 25 Drawing Sheets

(51) Int. Cl.
*G06F 3/041* (2006.01)
*G06F 21/32* (2013.01)
*G06V 40/13* (2022.01)
*H10N 30/20* (2023.01)
*H10N 30/50* (2023.01)
*H05K 1/18* (2006.01)

(52) U.S. Cl.
CPC ............ *G06F 21/32* (2013.01); *H10N 30/20* (2023.02); *H10N 30/50* (2023.02); *H05K 1/189* (2013.01)

(56) References Cited

U.S. PATENT DOCUMENTS

| | | | |
|---|---|---|---|
| 2015/0109256 A1 | 4/2015 | Lien et al. | |
| 2015/0189136 A1 | 7/2015 | Chung et al. | |
| 2017/0083098 A1 | 4/2017 | Usui | |
| 2018/0373913 A1* | 12/2018 | Panchawagh | G01S 7/52079 |
| 2019/0057236 A1 | 2/2019 | Liu et al. | |
| 2019/0122018 A1* | 4/2019 | Kho | G06V 40/1306 |
| 2020/0167537 A1* | 5/2020 | Lee | G06F 3/044 |

FOREIGN PATENT DOCUMENTS

| | | |
|---|---|---|
| CN | 108629273 A | 10/2018 |
| CN | 108924277 A | 11/2018 |
| CN | 109244108 A | 1/2019 |
| CN | 109389917 A | 2/2019 |
| CN | 106791198 B | 1/2021 |
| KR | 20140134120 | 11/2014 |
| KR | 1020150080812 | 7/2015 |
| KR | 101598413 | 3/2016 |
| KR | 1020170044496 | 4/2017 |
| WO | 2015186771 | 10/2015 |

OTHER PUBLICATIONS

The Extended European Search Report—EP 20161348.6 dated Nov. 3, 2020, citing references listed within.
The Partial European Search Report—European Application No. 20161348.6 dated Jul. 15, 2020, citing references isted within.
Chinese Office Action—Chinese Application No. 202010146463.4 dated Sep. 19, 2023, citing references listed within.

* cited by examiner

DISPLAY DEVICE AND METHOD OF DRIVING THE SAME

This application is a continuation of U.S. patent application Ser. No. 16/738,854, filed on Jan. 9, 2020, which claims priority to Korean Patent Application No. 10-2019-0027485, filed on Mar. 11, 2019, and all the benefits accruing therefrom under 35 U.S.C. § 119, the content of which in its entirety is herein incorporated by reference.

BACKGROUND

1. Field

The disclosure relates to a display device and a method of driving the display device.

2. Description of the Related Art

As the information society develops, the demand for display devices for displaying images is increasing in various forms. More particularly, display devices are being applied to various electronic devices such as smartphones, digital cameras, notebook computers, navigation devices, and smart televisions, for example. A display device may include a display panel for displaying an image and a sound generator for providing sound.

SUMMARY

With the application of display device to various electronic devices, a display device having various functions are desired. For example, a smartphone may be desired to include a display device that has wider display areas by removing a call receiver for outputting the other party's voice in a sound mode and a fingerprint sensor for recognizing a user's fingerprint from a front thereof.

Embodiments of the disclosure provide a display device capable of outputting sound using a vibrator not exposed to an outside and capable of recognizing a user's fingerprint using a fingerprint sensor not exposed to the outside.

Embodiments of the disclosure also provide a method of driving a display device for outputting sound using a vibrator not exposed to the outside and for recognizing a user's fingerprint using a fingerprint sensor not exposed to the outside.

According to an embodiment of the disclosure, a display device includes: a display panel; a fingerprint sensor which is disposed on a surface of the display panel and senses a user's fingerprint by emitting ultrasonic waves; and a first vibrator which is disposed on a surface of the fingerprint sensor and generates vibrations based on driving voltages applied thereto.

According to an embodiment of the disclosure, a display device includes: a display panel; a fingerprint sensor which is disposed on a surface of a display panel of the display device and senses a user's fingerprint by emitting ultrasonic waves; and a first vibrator which is disposed on the surface of the display panel and generates vibrations based on driving voltages applied thereto, where the fingerprint sensor and the first vibrator neighbor each other in a first direction.

According to an embodiment of the disclosure, a method of driving a display device includes: recognizing a user's fingerprint located on a surface of the display panel by emitting ultrasonic waves using a fingerprint sensor disposed on an opposing surface of the display panel in a fingerprint recognition mode; outputting a first sound by vibrating the display panel by vibrating a first vibrator, which is disposed on a surface of the fingerprint sensor, in a first frequency band in a sound mode; and providing haptic feedback by vibrating the first vibrator in a second frequency band in a vibration mode.

BRIEF DESCRIPTION OF THE DRAWINGS

These and/or other features of the invention will become apparent and more readily appreciated from the following description of the embodiments, taken in conjunction with the accompanying drawings, in which.

DETAILED DESCRIPTION

Figure 1:
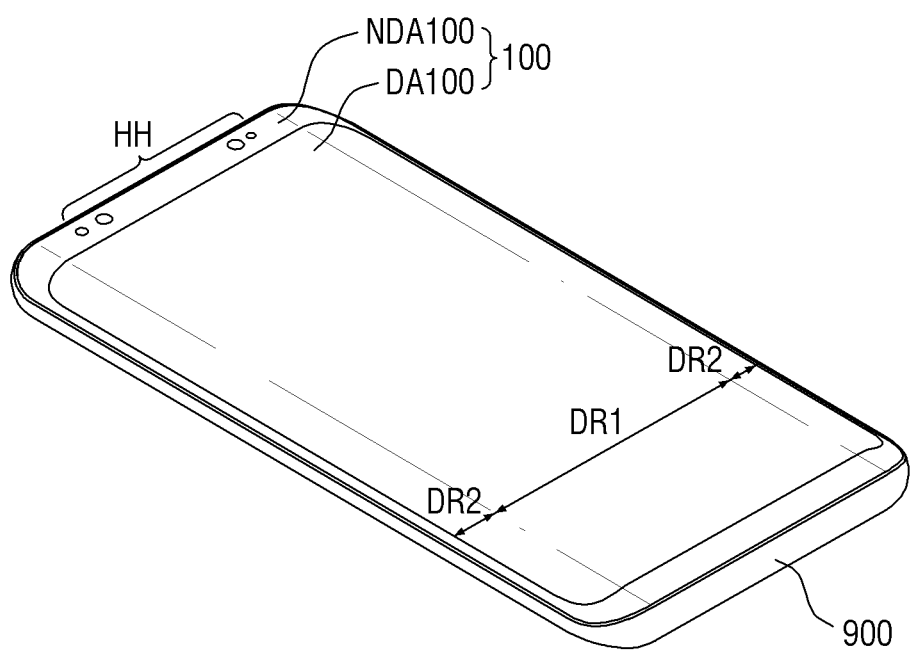
FIG. 1 is a perspective view of a display device according to an embodiment.

The invention will now be described more fully hereinafter with reference to the accompanying drawings, in which preferred embodiments of the invention are shown. The invention may, however, be embodied in different forms and should not be construed as limited to the embodiments set forth herein. Rather, these embodiments are provided so that this disclosure will be thorough and complete, and will filly convey the scope of the invention to those skilled in the art. The same reference numbers indicate the same components throughout the specification. In the attached figures, the thickness of layers and regions is exaggerated for clarity.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

It will also be understood that when a layer is referred to as being "on" another layer or substrate, it can be directly on the other layer or substrate, or intervening layers may also be present. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." "At least one of A and B" means "A and/or B." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system).

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, embodiments of the invention will be described with reference to the accompanying drawings.

Figure 2:
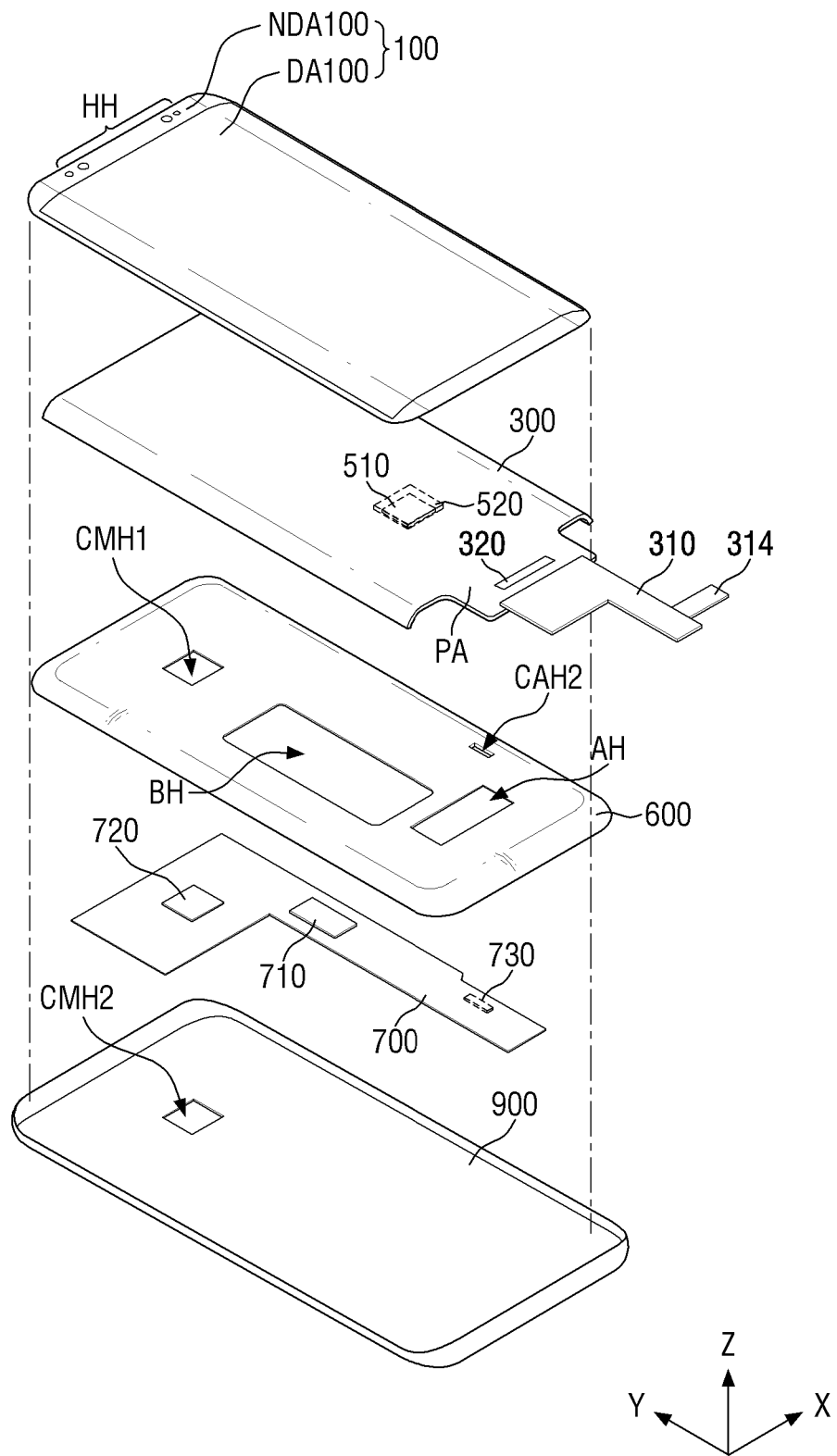
FIG. 2 is an exploded perspective view of the display device of FIG. 1.
Figure 3:
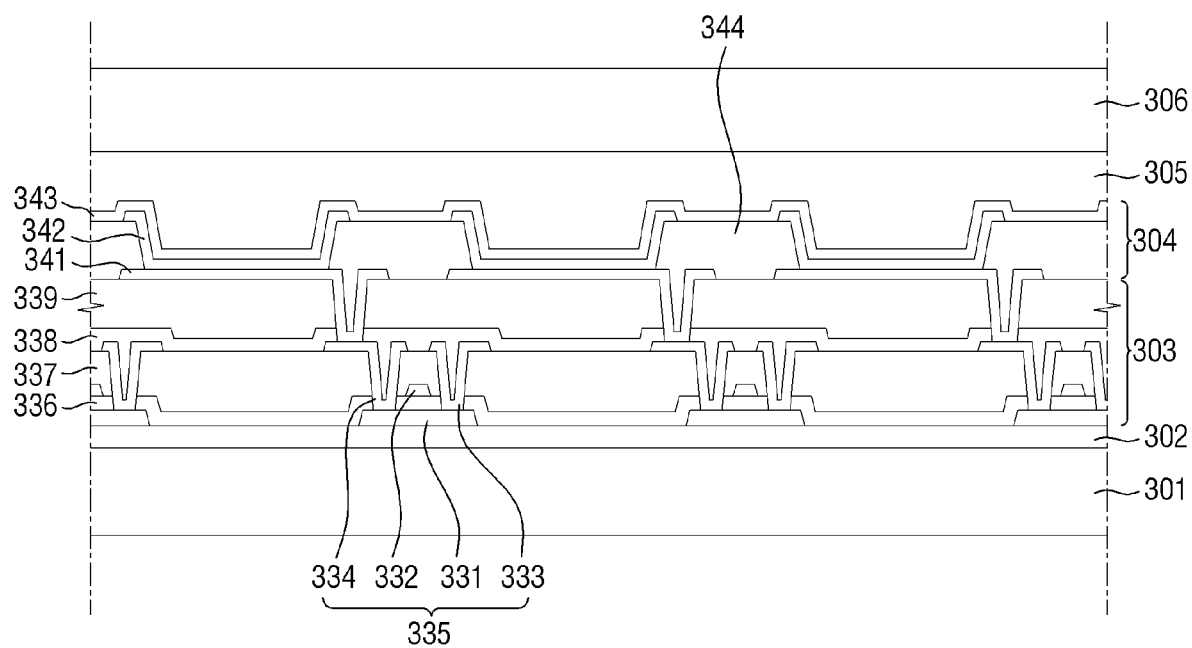
FIG. 3 is a detailed cross-sectional view of a display area of a display panel.
Figure 4:
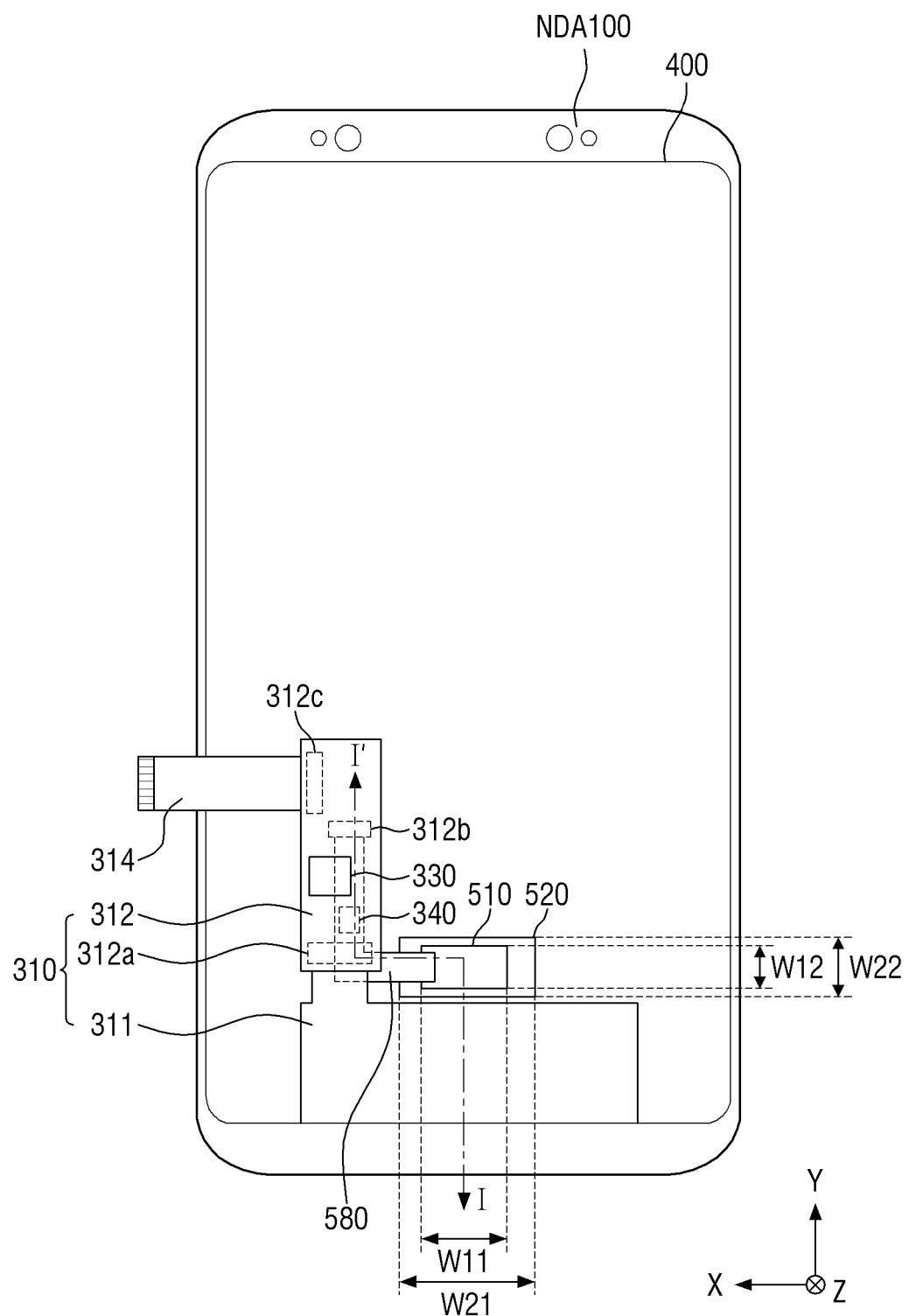
FIG. 4 is a bottom view of an embodiment of the display panel attached to a cover window of FIG. 2.
Figure 5:
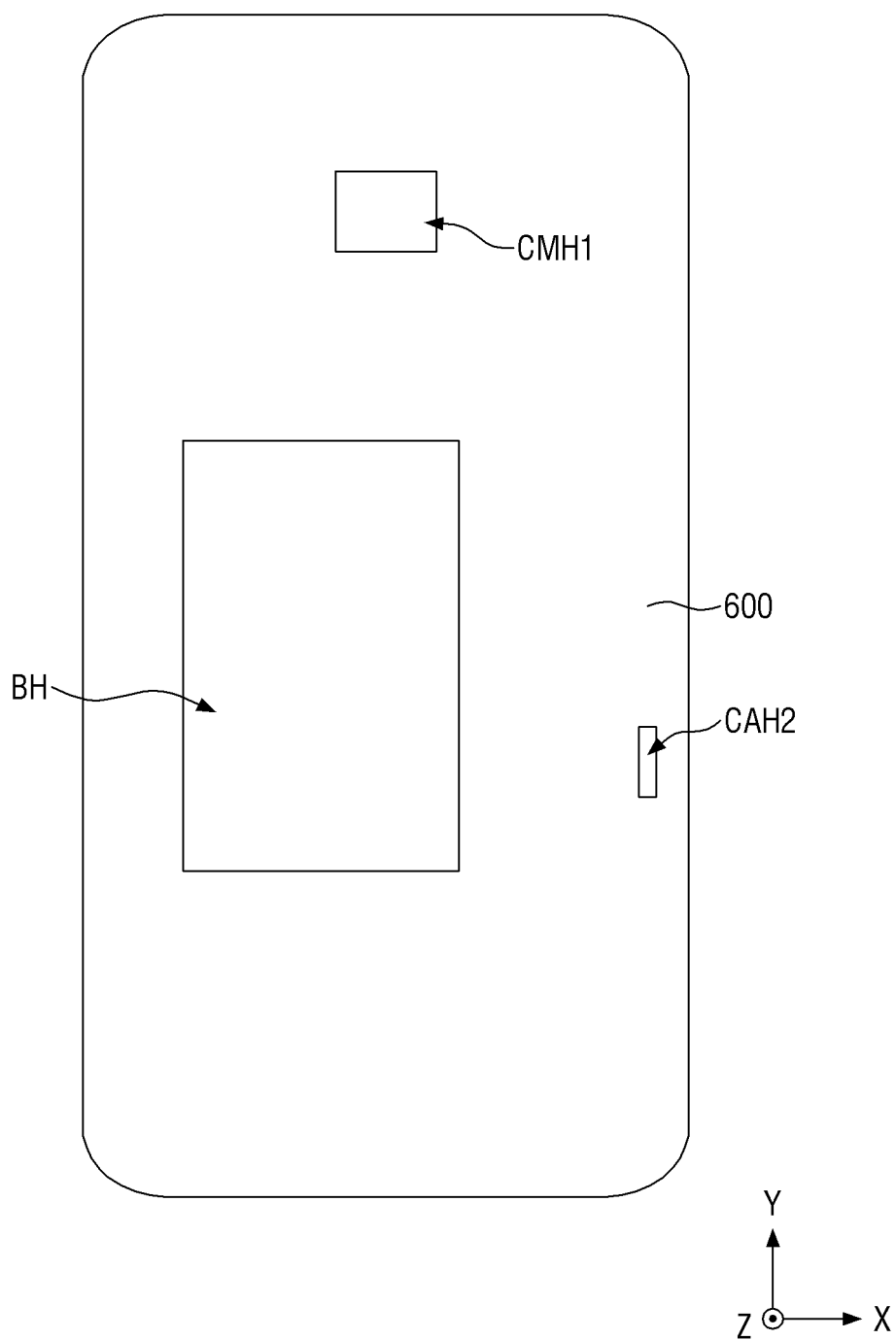
FIG. 5 is a plan view of an embodiment of a middle frame of FIG. 2.
Figure 6A:
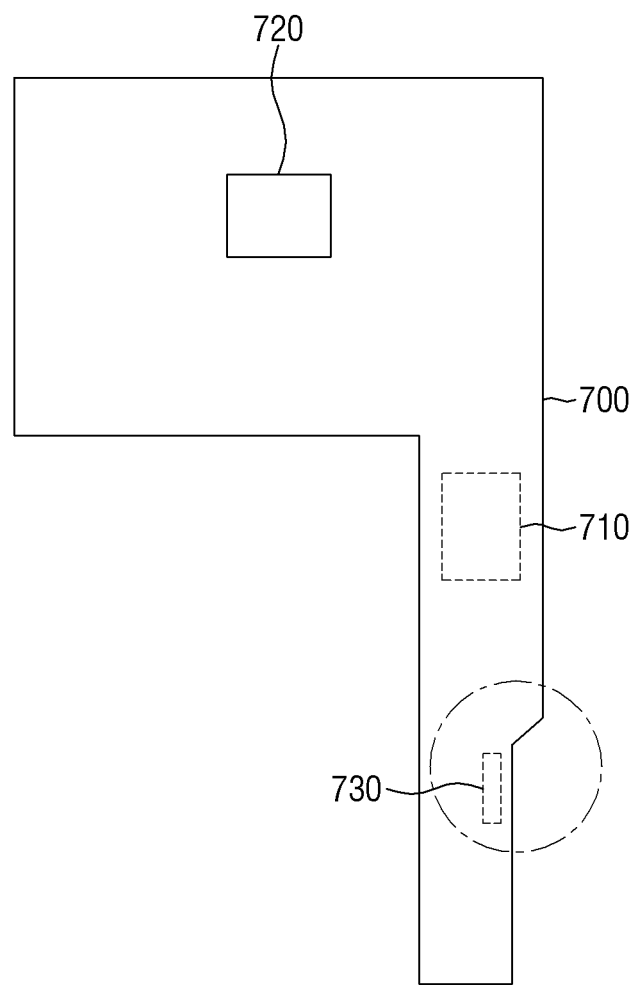
FIG. 6A is a plan view of an embodiment of a main circuit board of FIG. 2.
Figure 6B:
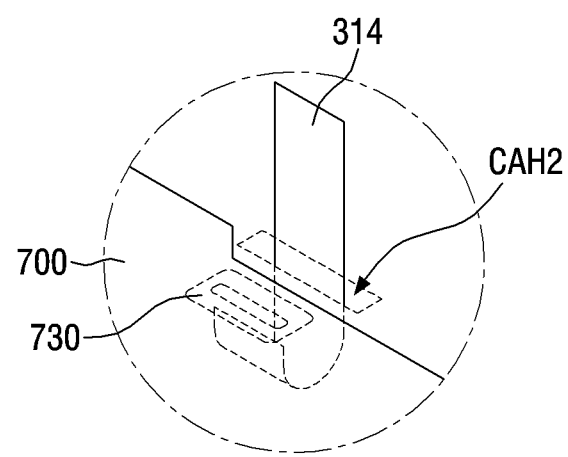
FIG. 6B is an enlarged view of the encircled portion of FIG. 6A.
Figure 7:
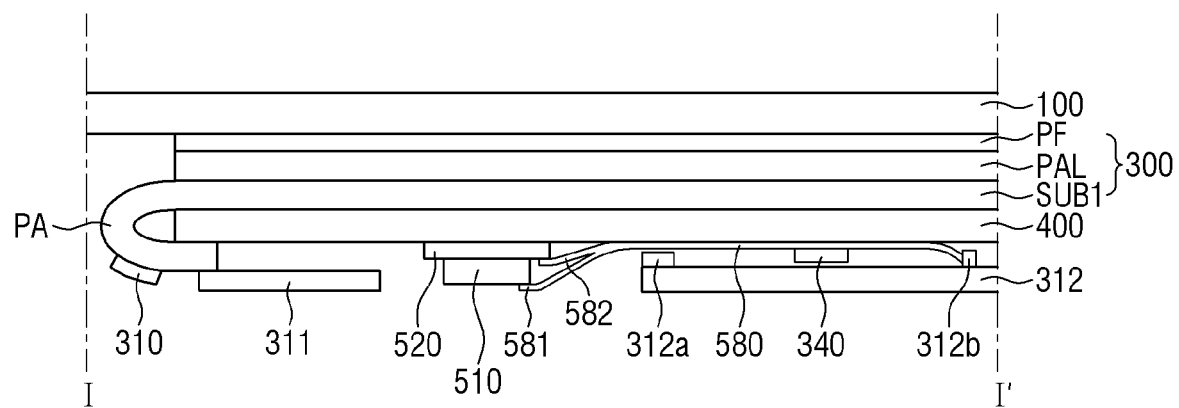
FIG. 7 is a cross-sectional view taken along line I-I' of FIG. 4.

FIG. 1 is a perspective view of a display device 10 according to an embodiment. FIG. 2 is an exploded perspective view of the display device 10 of FIG. 1. FIG. 3 is a detailed cross-sectional view of a display area DA of a display panel 300. FIG. 4 is a bottom view of an embodiment of the display panel 300 attached to a cover window 100 of FIG. 2. FIG. 5 is a plan view of an embodiment of a middle frame 600 of FIG. 2. FIG. 6A is a plan view of a main circuit board 700 of FIG. 2. FIG. 6B is an enlarged view of the encircled portion of FIG. 6A FIG. 7 is a cross-sectional view taken along line I-I' of FIG. 4.

Referring to FIGS. 1 through 7, an embodiment of the display device 10 includes the cover window 100, the display panel 300, a display circuit board 310, a display driver unit 320, a bottom panel member 400, a first vibrator 510, a fingerprint sensor 520, the middle frame 600, the main circuit board 700, and a lower cover 900.

herein, the terms "above", "top" and "upper surface" indicate a direction in which the cover window 100 is disposed with respect to the display panel 300, that is, a Z-axis direction, and the terms "below," "bottom" and "lower surface" indicate a direction in which the middle frame 600 is disposed with respect to the display panel 300, that is, a direction opposite to the Z-axis direction. In addition, "left," "right," "upper" and "lower" indicate directions when the display panel 300 is seen in a plan view. For example, "left" indicates a direction opposite to an X-axis direction, "right" indicates the X-axis direction, "upper" indicates a Y-axis direction, and "lower" indicates the direction opposite to a direction opposite to the Y-axis direction.

The display device 10 may have a rectangular shape in a plan view or when viewed from a plan view in a thickness direction of the display device 10. In one embodiment, for example, the display device 10 may have a rectangular planar shape having short sides in a first direction (X-axis direction) and long sides in a second direction (Y-axis direction) as illustrated in FIGS. 1 and 2. Each corner where a short side extending in the first direction (X-axis direction) meets a long side extending in the second direction (Y-axis direction) may be rounded with a predetermined curvature or may be right-angled. In such an embodiment, the planar shape of the display device 10 is not limited to the rectangular shape, but may be variously modified to have another polygonal shape, a circular shape, or an elliptical shape.

The display device 10 may include a first area DR1, which is flat, and a second area DR2 extending from right and left sides of the first area DR1. The second area DR2 may be flat or curved. In an embodiment, where the second area DR2 is flat, an angle formed by the first area DR1 and the second area DR2 may be an obtuse angle. In an alternative embodiment, where the second area DR2 is curved, the second area DR2 may have a constant curvature or a varying curvature.

In an embodiment, as shown in FIG. 1, the second area DR2 extends from each of the right and left sides of the first area DR1. However, embodiments are not limited to this case. Alternatively, the second area DR2 may extend from only one of the right and left sides of the first area DR1. Alternatively, the second area DR2 may extend not only from the right and left sides of the first area DR1 but also from at least one of upper and lower sides of the first area DR1. Hereinafter for convenience of descriptions, embodiments where the second area DR2 is disposed at or extends from right and left edges of the display device 10 will be described in detail.

The cover window 100 may be disposed above the display panel 300 to cover an upper surface of the display panel 300. In such an embodiment, the cover window 100 may function to protect the upper surface of the display panel 300. The cover window 100 may be attached to the upper surface of the display panel 300 by an adhesive member. The cover window 100 may include or be made of a glass, sapphire, and/or a plastic. The cover window 100 may be rigid or flexible. In an embodiment, the adhesive member may be an optically clear adhesive film ("OCA") or an optically clear resin ("OCR").

The cover window 100 may include a transmissive portion DA100 corresponding to the display panel 300 and a light shielding portion NDA100 corresponding to an area other than the display panel 300. The cover window 100 may be disposed in the first area DR1 and the second areas DR2. The transmissive portion DA100 may be disposed in a part of the first area DR1 and a part of each of the second areas DR2. The light shielding portion NDA 100 may be opaque. Alternatively, the light shielding portion NDA100 may be a decorative layer having a pattern to be shown to a user. In one embodiment, for example, the light shielding portion NDA100 may be patterned with a company's logo or various characters. In an embodiment, holes HH for exposing a front camera, an iris recognition sensor, an illuminance sensor, etc. may be defined or formed in the light shielding portion NDA100. However, embodiments are not limited thereto. In one embodiment, for example, some or all of the front camera, the iris recognition sensor, and the illuminance sensor may be embedded in the display panel 300, in which some or all of the holes HH may be omitted.

The display panel 300 may be disposed under the cover window 100. The display panel 300 may be overlapped by the transmissive portion 100DA of the cover window 100. The display panel 300 may be disposed in the first area DR1 and the second areas DR2. Therefore, an image of the display panel 300 is allowed to be seen not only in the first area DR1 but also in the second areas DP2.

In an embodiment, a polarizing film PF may be attached between the display panel 300 and the cover window 100 as illustrated in FIG. 7 to prevent a decrease in visibility due to reflection of external light. The polarizing film PF may include a linear polarizer and a retardation film such as a quarter-wave (λ/4) plate. In such an embodiment, the retardation film may be disposed on the display panel 300, and the linear polarizer may be disposed between the retardation film and the cover window 100.

The display panel 300 may be a light emitting display panel including light emitting elements. In one embodiment, for example, the display panel 300 may be an organic light emitting display panel using organic light emitting diodes, a micro light emitting diode display panel using micro light emitting diodes, or a quantum dot light emitting display panel including quantum dot light emitting diodes. Hereinafter, embodiments where the display panel 300 is an organic light emitting display panel will be mainly described in detail.

The display panel 300 may include, as illustrated in FIG. 3, a first substrate 301 (also referred to as SUB1), a pixel array layer (PAL in FIG. 7) including a thin-film transistor layer 303 disposed on the first substrate 301, a light emitting element layer 304 and a thin-film encapsulation layer 305, and a touch sensor layer 306 disposed on the thin-film encapsulation layer 305. The display area DA of the display panel 300 is an area where the light emitting element layer 304 is disposed to display an image, and a non-display area NDA is an area around the display area DA.

The first substrate 301 may be a rigid substrate or a flexible substrate that can be bent, folded, and rolled (i.e., a bendable, foldable or rollable substrate). The first substrate 301 may include or be made of an insulating material such as a glass, quartz, or a polymer resin. The polymer material may be, for example, polyethersulphone ("PES"), polyacrylate ("PA"), polyarylate ("PAR"), polyetherimide ("PEI"), polyethylene naphthalate ("PEN"), polyethylene terepthalate ("PET"), polyphenylene sulfide ("PPS"), polyallylate, polyimide ("PI"), polycarbonate ("PC"), cellulose triacetate ("CAT"), cellulose acetate propionate ("CAP"), or a combination thereof. The first substrate 301 may include a metal material.

The thin-film transistor layer 303 is disposed on the first substrate 301. The thin-film transistor layer 303 includes thin-film transistors 335, a gate insulating layer 336, an interlayer insulating film 337, a protective layer 338, and a planarization layer 339.

A buffer layer 302 may be disposed on the first substrate 301. The buffer layer 302 may be disposed between the first substrate 301 and the thin-film transistor layer 303 to protect the thin-film transistors 335 and the light emitting elements from moisture introduced through the first substrate 301 which is vulnerable to moisture penetration. The buffer layer 302 may include or be composed of a plurality of inorganic layers stacked alternately on one another. In one embodiment, for example, the buffer layer 302 may have a multi-layer structure in which one or more inorganic layers selected from a silicon oxide (SiOx) layer, a silicon nitride (SiNx) layer, and SiON are alternately stacked on one another. Alternatively, the buffer layer 302 may be omitted.

The thin-film transistors 335 are disposed on the buffer layer 302. Each of the thin-film transistors 335 includes an active layer 331, a gate electrode 332, a source electrode 333, and a drain electrode 334. In an embodiment, as shown in FIG. 3, each of the thin-film transistors 335 is a top-gate type in which the gate electrode 332 is located above the active layer 331. However, embodiments are not limited thereto. Alternatively, each of the thin-film transistors 335 may be a bottom-gate type in which the gate electrode 332 is located under the active layer 331 or a double-gate type in which the gate electrode 332 is located both above and under the active layer 331.

The active layers 331 are disposed on the buffer layer 302. The active layers 331 may include or be made of a silicon-based semiconductor material or an oxide-based semiconductor material. A light shielding layer may be disposed between the buffer layer 302 and the active layers 331 to block external light from entering into the active layers 331.

The gate insulating layer 336 may be disposed on the active layers 331. The gate insulating layer 336 may be an inorganic layer, for example, a SiOx layer, a SiNx layer, or a multilayer including or composed thereof.

The gate electrodes 332 and gate lines may be disposed on the gate insulating layer 336. Each of the gate electrodes 332 and the gate lines may be a single layer or a multilayer, where each layer includes one or more of molybdenum (Mo), aluminum (Al), chromium (Cr), gold (Au), titanium (Ti), nickel (Ni), neodymium (Ne), copper (Cu), and an combination (e.g., an alloy) thereof.

The interlayer insulating film 337 may be disposed on the gate electrodes 332 and the gate lines. The interlayer insulating film 337 may be an inorganic layer, for example, a SiOx layer, a SiNx layer, or a multilayer including or composed of such layers.

The source electrodes 333, the drain electrodes 334, and data lines may be disposed on the interlayer insulating film 337. Each of the source electrodes 333 and the drain electrodes 334 may be connected to an active layer 331 through a contact hole defined through the gate insulating layer 336 and the interlayer insulating film 337. Each of the source electrodes 333, the drain electrodes 334 and the data lines may be a single layer or a multilayer, where each layer includes or is made of one or more of molybdenum (Mo), aluminum (Al), chromium (Cr), gold (Au), titanium (Ti), nickel (Ni), neodymium (Ne), copper (Cu), and a combination thereof.

The protective layer 338 for insulating the thin-film transistors 335 may be disposed on the source electrodes 333, the drain electrodes 334, and the data lines. The protective layer 338 may be an inorganic layer, for example, a SiOx layer, a SiNx layer, or a multilayer composed of such layers.

The planarization layer 339 may be disposed on the protective layer 338 to planarize any step structure therebelow due to the thin-film transistors 335. The planarization layer 339 may include or be made of an organic layer such as acryl resin, epoxy resin, phenolic resin, polyamide resin, or polyimide resin.

The light emitting element layer 304 is disposed on the thin-film transistor layer 303. The light emitting element layer 304 includes the light emitting elements and a pixel defining layer 344.

The light emitting elements and the pixel defining layer 344 are disposed on the planarization layer 339. In an embodiment, the light emitting elements may be organic light emitting devices. In such an embodiment, each of the light emitting elements may include an anode 341, a light emitting layer 342, and a cathode 343.

The anodes 341 may be disposed on the planarization layer 339. The anodes 341 may be connected to the source electrodes 333 or the drain electrode 334 of the thin-film transistors 335 through contact holes defined through the protective layer 338 and the planarization layer 339.

The pixel defining layer 344 may be disposed on the planarization layer 339 and may cover edges of the anodes 341 to define pixels. In an embodiment, the pixel defining layer 344 serves as a pixel defining layer for defining pixels. Each of the pixels is an area in which the anode 341, the light emitting layer 342 and the cathode 343 are sequentially stacked on one another such that holes from the anode 341 and electrons from the cathode 343 combine together in the light emitting layer 342 to emit light.

The light emitting layers 342 are disposed on the anodes 341 and the pixel defining layer 344. The light emitting layers 342 may be organic light emitting layers. Each of the light emitting layers 342 may emit one of red light, green light, and blue light. Alternatively, the light emitting layers 342 may be white light emitting layers which emit white light. In such an embodiment, the light emitting layers 342 may have a stack structure including a red light emitting layer, a green light emitting layer and a blue light emitting layer and may be a common layer disposed to commonly cover the pixels. In such an embodiment, the display panel 300 may further include color filters for displaying red, green and blue.

Each of the light emitting layers 342 may include a hole transporting layer, a light emitting layer, and an electron transporting layer. In such an embodiment, each of the light emitting layers 342 may be in a tandem structure of two or more stacks, in which a charge generating layer may be disposed between the stacks.

The cathode 343 is disposed on the light emitting layers 342. The cathode 343 may cover the light emitting layers 342. The cathode 343 may be a common layer formed commonly to the pixels or disposed to cover the entire pixels.

In an embodiment, where the light emitting element layer 304 is a top emission type which emits light in an upward direction, the anodes 341 may include or be made of a metal material having high reflectivity, such as a stacked structure (Ti/Al/Ti) of Al and Ti, stacked structure (ITO/AUTO) of Al and indium tin oxide ("ITO"), an APC alloy, or a stacked structure (ITO/APC/ITO) of an APC alloy and ITO. Here, APC alloy is an alloy of Ag, palladium (Pd), and Cu. In an embodiment, the cathode 343 may be made of a transparent conductive material ("TCO") capable of transmitting light, such as ITO or indium zinc oxide ("IZO"), or a semi-transmissive conductive material such as magnesium (Mg), Ag or an alloy of Mg and Ag. In an embodiment, where the cathode 343 includes or is made of a semi-transmissive conductive material, the light output efficiency may be increased by microcavity effect.

The thin-film encapsulation layer 305 is disposed on the light emitting element layer 304. The thin-film encapsulation layer 305 serves to prevent oxygen or moisture from permeating the light emitting layers 342 and the cathode 343. In such an embodiment, the thin-film encapsulation layer 305 may include at least one inorganic layer. The inorganic layer may include or be made of silicon nitride, aluminum nitride, zirconium nitride, titanium nitride, hafnium nitride, tantalum nitride, silicon oxide, aluminum oxide, or titanium oxide. In an embodiment, the thin-film encapsulation layer 305 may further include at least one organic layer. The organic layer may have a sufficient thickness or a thickness greater than a predetermined thickness to prevent particles entering into the light emitting layers 342 and the cathode 343 through the thin-film encapsulation layer 305. The organic layer may include at least one of epoxy, acrylate, and urethane acrylate.

The touch sensor layer 306 is disposed on the thin-film encapsulation layer 305. In an embodiment, where the touch sensor layer 306 is disposed directly on the thin-film encapsulation layer 305, a thickness of the display device 10 may be reduced as compared with a case where a separate touch panel including the touch sensor layer 306 is attached onto the thin-film encapsulation layer 305.

The touch sensor layer 306 may include touch electrodes for sensing a user's touch using a capacitance method and touch lines for connecting pads and the touch electrodes. In one embodiment, for example, the touch sensor layer 306 may sense a user's touch using a self-capacitance method or a mutual capacitance method.

The touch electrodes of the touch sensor layer 306 may be disposed in the display area DA. The touch lines of the touch sensor layer 306 may be disposed in the non-display area NDA.

The display circuit board 310 and the display driver unit 320 may be attached to a protruding area PA provided or defined on a side of the display panel 300. An end of the display circuit board 310 may be attached onto pads disposed in the protruding area PA of the display panel 300 by using an anisotropic conductive film. The protruding area PA of the display panel 300 and the display circuit board 310 may be bent toward a lower surface of the display panel 300.

The display driver unit 320 receives control signals and power supply voltages through the display circuit board 310, and the display driver unit 320 generates and outputs signals and voltages for driving the display panel 300. The display driver unit 320 may be formed as an integrated circuit and attached onto the protruding area PA of the display panel 300 using a chip-on glass ("COG") method, a chip-on plastic ("COP") method, or an ultrasonic method. However, embodiments are not limited thereto. In one embodiment, for example, the display driver unit 320 may be attached onto the display circuit board 310.

The display circuit board 310 may include a first circuit board 311 and a second circuit board 312 as illustrated in FIG. 4. An end of the first circuit board 311 may be attached to the pads of the protruding area PA on a side of the display panel 300. The other end of the first circuit board 311 may be connected to a first connector 312a of the second circuit board 312. A second connector 312b of the second circuit board 312 may be connected to an end of a flexible circuit board 580. A third connector 312c of the second circuit board 312 may be connected to an end of a cable 314. A touch driver unit 330 may be disposed on a surface of the second circuit board 312. In an embodiment, the first connector 312a, the second connector 312b, and the third connector 312c may be disposed on the other surface of the second circuit board 312. The other surface of the second circuit board 312 may be a surface facing the bottom panel member 400.

The other end of the cable 314 may be connected to a main connector 730 of the main circuit board 700 disposed under the middle frame 600 through a cable hole CAH2 defined through the middle frame 600, as illustrated in FIGS. 5 and 6.

The other end of the flexible circuit board 580 may include a first pad portion 581 electrically connected to the first vibrator 510 and a second pad portion 582 electrically connected to the fingerprint sensor 520 as illustrated in FIG. 7. In such an embodiment, the first pad portion 581 and the second pad portion 582 may branch from the other end of the flexible circuit board 580. In such an embodiment, a length of the pad portion 581 may be greater than a length of the second pad portion 582.

In an embodiment, as shown in FIG. 4, the first vibrator 510 and the fingerprint sensor 520 are connected to a single flexible circuit board 580, but embodiments are not limited thereto. In one alternative embodiment, for example, the first vibrator 510 and the fingerprint sensor 520 may be connected to different flexible circuit boards 580, respectively. In such an embodiment, an integrated driver unit 340 may be disposed on the second circuit board 312 instead of the flexible circuit board 580.

The touch driver unit 330 may be disposed on the display circuit board 310. The touch driver unit 330 may be formed as an integrated circuit and attached to an upper surface of the display circuit board 310. The touch driver unit 330 may be connected to the touch electrodes and the touch lines of the touch sensor layer 306 of the display panel 300 through the display circuit board 310. In an embodiment, the touch driver unit 330 may transmit touch driving signals to driving electrodes among the touch electrodes and sense a touch by detecting charged voltages of mutual capacitances between the driving electrodes and sensing electrodes among the touch electrodes (the mutual capacitance method).

The bottom panel member 400 may be disposed under the display panel 300. The bottom panel member 400 may be attached to the lower surface of the display panel 300 by an adhesive member. The adhesive member may be a pressure sensitive adhesive ("PSA").

The bottom panel member 400 may include at least one of a light absorbing member for absorbing light incident from an outside, a buffer member for absorbing an external impact, a heat dissipating member for efficiently dissipating the heat of the display panel 300, and a light shielding layer for blocking light incident from the outside.

The light absorbing member may be disposed under the display panel 300. The light absorbing member blocks transmission of light to prevent elements disposed thereunder, for example, the display circuit board 310, the first vibrator 510, the fingerprint sensor 520, etc., from being seen from above the display panel 300. The light absorbing member may include a light absorbing material such as a black pigment or dye.

The buffer member may be disposed under the light absorbing member. The buffer member absorbs external impact to prevent the display panel 300 from being damaged. The buffer member may have a single-layer structure or a multi-layer structure. In one embodiment, for example, the buffer member may include or be made of a polymer resin such as polyurethane, PC, polypropylene or polyethylene or may include or be made of an elastic material such as sponge formed by foaming rubber, a urethane-based material or an acrylic-based material. The buffer member may be a cushion layer.

The heat dissipating member may be disposed under the buffer member. The heat dissipating member may include a first heat dissipating layer including graphite or carbon nanotubes and a second heat dissipating layer including a metal thin film (such as copper, nickel, ferrite or silver) capable of shielding electromagnetic waves and having high thermal conductivity.

The display circuit board 310, the first vibrator 510, and the fingerprint sensor 520 may be attached to the bottom of the bottom panel member 400. The display circuit board 310 may be attached to a lower surface of the bottom panel member 400 by an adhesive member or a fixing member. The first vibrator 510 may be attached to a lower surface of the fingerprint sensor 520. The adhesive member may be a PSA, and the fixing member may be screws.

In an embodiment, where the first vibrator 510 and the fingerprint sensor 520 are disposed on the heat dissipating member of the bottom panel member 400, the first heat dissipating layer or the second heat dissipating layer of the heat dissipating member may be broken by the vibration of the first vibrator 510 and/or the fingerprint sensor 520. Therefore, in such an embodiment, the heat dissipating member may be removed from an area where the first vibrator 510 and the fingerprint sensor 520 are disposed. In such an embodiment, the first vibrator 510 and the fingerprint sensor 520 may be attached to a lower surface of the buffer member. Alternatively, the bottom panel member 400 may be removed from the area where the first vibrator 510 and the fingerprint sensor 520 are disposed. In such an embodiment, the first vibrator 510 and the fingerprint sensor 520 may be attached to the lower surface of the display panel 300.

In an embodiment, the first vibrator 510 may include a first vibration layer having a piezoelectric material that contracts or expands according to driving voltages. In such an embodiment, when the first vibrator 510 vibrates in a first frequency band, the display panel 300 may be vibrated by the first vibrator 510, thereby outputting a first sound. When the first vibrator 510 vibrates in a second frequency band, the vibration of the first vibrator 510 may provide haptic feedback to a user. The second frequency band may be lower than the first frequency band.

In an embodiment, the fingerprint sensor 520 may include a second vibration layer having a piezoelectric material that contracts or expands according to driving voltages. In such an embodiment, when the fingerprint sensor 520 vibrates in a third frequency band, the vibration of the fingerprint sensor 520 may output ultrasonic waves. The third frequency band may be higher than the first frequency band. The third frequency band may be a frequency band of about 20 kilohertz (kHz) or higher. The piezoelectric material of the first vibration layer and the piezoelectric material of the second vibration layer may be substantially the same as each other.

In an embodiment, since no air gap exists in the display device 10, ultrasonic waves emitted from the fingerprint sensor 520 may be reflected by a user's fingerprint located on the upper surface of the display panel 300 and then sensed by the fingerprint sensor 520. In such an embodiment, the ultrasonic waves sensed by the fingerprint sensor 520 may have a different reflection pattern according to ridges and valleys of the user's fingerprint. The fingerprint sensor 520 may sense the reflection pattern of the ultrasonic waves according to the valleys and ridges of the fingerprint, thereby sensing the user's fingerprint pattern.

Since the first vibrator 510 is disposed on a surface of the fingerprint sensor 520, a width W11 of the first vibrator 510 in the first direction (X-axis direction) may be smaller than a width W21 of the fingerprint sensor 520 in the first direction (X-axis direction). In an embodiment, a width W12 of the first vibrator 510 in the second direction (Y-axis direction) may be smaller than a width W22 of the fingerprint sensor 520 in the second direction (Y-axis direction).

The first vibrator 510 and the fingerprint sensor 520 may be electrically connected to the integrated driver unit 340, which drives the first vibrator 510 and the fingerprint sensor 520, by the flexible circuit board 580. The integrated driver unit 340 may be formed as an integrated circuit and disposed on a surface of the flexible circuit board 580. The surface of the flexible circuit board 580 may be a surface facing the bottom panel member 400.

In an embodiment, as in FIG. 4, the first vibrator 510 and the fingerprint sensor 520 are disposed closer to a lower side of the display panel 300 than to an upper side of the display panel 300, but the position of the first vibrator 510 and the fingerprint sensor 520 is not limited thereto. In such an embodiment, the first vibrator 510 and the fingerprint sensor 520 may be disposed in an area where there is no other mechanical interference in the display area DA of the display panel 300. In one embodiment, for example, the first vibrator 510 and the fingerprint sensor 520 may be disposed in an area that does not overlap the display circuit board 310, a battery hole BH and camera holes CH defined in the middle frame 600, etc.

The integrated driver unit 340 receives first vibration data from a main processor 710 in a sound mode. The integrated driver unit 340 generates a first driving voltage and a second driving voltage corresponding to the first vibration data and supplies the first driving voltage and the second driving voltage to the first vibrator 510 through the flexible circuit board 580. Accordingly, the first vibrator 510 vibrates the display panel 300 by vibrating in the first frequency band, thereby outputting the first sound.

The integrated driver unit 340 receives second vibration data from a main processor 710 in a haptic mode. The integrated driver unit 340 generates a first driving voltage and a second driving voltage corresponding to the second vibration data and supplies the first driving voltage and the second driving voltage to the first vibrator 510 through the flexible circuit board 580. Accordingly, the first vibrator 510 vibrates in the second frequency band, thereby providing haptic feedback.

The integrated driver unit 340 receives third vibration data or sensing control data from the main processor 710 in a fingerprint recognition mode. The integrated driver unit 340 generates a third driving voltage and a fourth driving voltage corresponding to the third vibration data and supplies the third driving voltage and the fourth driving voltage to the fingerprint sensor 520 through the flexible circuit board 580. Accordingly, the fingerprint sensor 520 vibrates in the third frequency band, thereby outputting ultrasonic waves. In such an embodiment, the integrated driver unit 340 generates a third driving voltage based on the sensing control data and supplies the third driving voltage to the fingerprint sensor 520 through the flexible circuit board 580. Therefore, the fingerprint sensor 520 may have a piezoelectric effect due to ultrasonic waves reflected by a user's fingerprint. Accordingly, sensing voltages generated by fourth electrodes 523 may be sensed by the integrated driver unit 340.

The integrated driver unit 340 may include a digital signal processor ("DSP") for processing a digital signal, that is, the first vibration data, the second vibration data, the third vibration data, or the sensing control data, a digital-analog converter ("DAC") for converting the digital data processed by the DSP into analog signals, that is, driving voltages, and an amplifier ("AMP") for amplifying the analog signals, that is, the driving voltages output from the DAC and outputting the amplified analog signals.

The middle frame 600 may be disposed under the bottom panel member 400. The middle frame 600 may include a plastic, a metal, or a combination thereof.

In an embodiment, a first camera hole CMH1 into which a camera device 720 is inserted, the battery hole BH in which a battery is disposed, and the cable hole CAH2 through which the cable 314 connected to the display circuit board 310 passes may be defined or formed in the middle frame 600. In such an embodiment, an accommodating hole AH for accommodating the first vibrator 510 and the fingerprint sensor 520 may be defined or formed in the middle frame 600. A width of the accommodating hole AH in the first direction (X-axis direction) is greater than a width of the first vibrator 510 in the first direction (X-axis direction) and a width of the fingerprint sensor 520 in the first direction (X-axis direction). A width of the accommodating hole AH in the second direction (Y-axis direction) is greater than a width of the first vibrator 510 in the second direction (Y-axis direction) and a width of the fingerprint sensor 520 in the second direction (Y-axis direction).

If the first vibrator 510 and the fingerprint sensor 520 overlap the battery hole BH in which the battery is disposed, the first vibrator 510 and the fingerprint sensor 520 may be affected by the heat generated from the battery. Therefore, in an embodiment, the first vibrator 510 and the fingerprint sensor 520 may be disposed not to overlap the battery hole BH.

The main circuit board 700 may be disposed under the middle frame 600. The main circuit board 700 may be a printed circuit board or a flexible printed circuit board.

The main circuit board 700 may include the main processor 710, the camera device 720, and the main connector 730. The camera device 720 may be disposed on both upper and lower surfaces of the main circuit board 700, the main processor 710 may be disposed on the upper surface of the main circuit board 700, and the main connector 730 may be disposed on the lower surface of the main circuit board 700.

The main processor 710 may control overall functions of the display device 10. In an embodiment, the main processor 710 may output digital video data to the display driver unit 320 through the display circuit board 310 so that the display panel 300 displays an image. In such an embodiment, the main processor 710 may receive touch data from the touch driver unit 330, determine a user's touch position, and then execute an application indicated by an icon displayed at the user's touch position.

In such an embodiment, the main processor 710 may output the first vibration data to the integrated driver unit 340 which drives the first vibrator 510 and the fingerprint sensor 520 to vibrate the first vibrator 510 in the sound mode and the haptic mode. The main processor 710 may output the third vibration data to the integrated driver unit 340 to emit ultrasonic waves by vibrating the fingerprint sensor 520 in the fingerprint recognition mode. The main processor 710 may output the sensing control data to the integrated driver unit 340 to sense the ultrasonic waves reflected by a user's fingerprint in the fingerprint recognition mode. The main processor 710 may receive sensing data corresponding to sensing voltages sensed by the integrated driver unit 340 in the fingerprint recognition mode. The main processor 710 may recognize a fingerprint pattern by analyzing the sensing data and determine whether the recognized fingerprint pattern matches a fingerprint pattern stored in advance in a memory.

The main processor 710 may be an application processor, a central processing unit, or a system chip formed as an integrated circuit.

The camera device 720 processes an image frame such as a still image or a moving image obtained by an image sensor in a camera mode and outputs the processed image frame to the main processor 710.

The connection cable 314 disposed through the cable hole CAH2 of the middle frame 600 may be connected to the main connector 730. Therefore, the main circuit board 700 may be electrically connected to the display circuit board 310 and a touch circuit board 210.

In an embodiment, the main circuit board 700 may further include a mobile communication module capable of transmitting or receiving a wireless signal to or from at least one of a base station, an external terminal, and a server over a mobile communication network. The wireless signal may include a voice signal, a video call signal, or various types of data according to transmission/reception of text/multimedia messages.

The lower cover 900 may be disposed under the middle frame 600 and the main circuit board 700. The lower cover 900 may be attached, e.g., fastened and fixed, to the middle frame 600. The lower cover 900 may define the lower exterior of the display device 10. The lower cover 900 may include a plastic and/or a metal.

A second camera hole CMH2 into which the camera device 720 is inserted to protrude outward may be defined or formed in the lower cover 900. The position of the camera device 720 and the positions of the first and second camera holes CMH1 and CMH2 corresponding to the camera device 720 are not limited to those illustrated in FIG. 2.

According to an embodiment, as illustrated in FIGS. 1 through 7, the fingerprint sensor 520 capable of recognizing a user's fingerprint is disposed on a surface of the display panel 300, and the first vibrator 510 capable of outputting sound by vibrating the display panel 300 and providing haptic feedback by generating vibrations is disposed on a surface of the fingerprint sensor 520. Therefore, the user's fingerprint may be recognized using the fingerprint sensor 520, sound may be output and haptic feedback may be provided using the first vibrator 510, without being exposed outside. Thus, a call receiver for outputting the other party's voice and a fingerprint sensor for recognizing a user's fingerprint may be removed from the front of the display device 10, thereby widening the transmissive portion DA100 of the cover window 100. Accordingly, an area where an image is displayed by the display panel 300 may be widened.

According to an embodiment, as illustrated in FIGS. 1 through 7, the fingerprint sensor 520 and the first vibrator 510 are disposed on a surface of the display panel 300 to overlap each other in a thickness direction of the display panel 300. Therefore, a space in which the fingerprint sensor 520 and the first vibrator 510 are disposed may be minimized.

Figure 8:
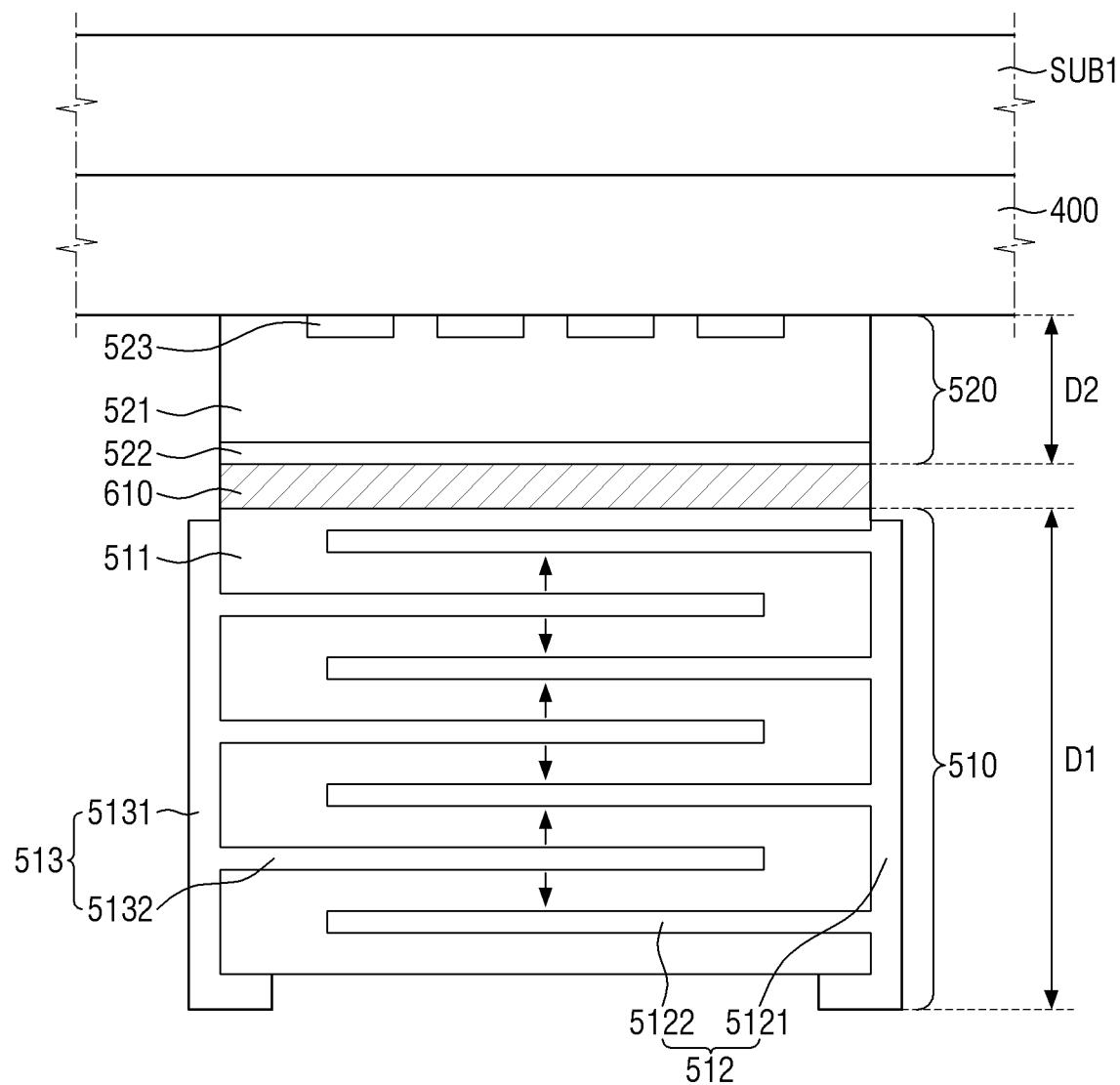
FIG. 8 is a schematic cross-sectional view of a fingerprint sensor and a first vibrator of FIG. 7.

FIG. 8 is a schematic cross-sectional view of the fingerprint sensor 520 and the first vibrator 510 of FIG. 7.

Referring to FIG. 8, the first vibrator 510 may output sound or provide haptic feedback by generating vibrations in response to driving voltages applied thereto, and the fingerprint sensor 520 may output ultrasonic waves by generating vibrations in response to driving voltages applied thereto.

The first vibrator 510 may include a first vibration layer 511, a first electrode 512, and a second electrode 513.

The first electrode 512 may include a first stem electrode 5121 and first branch electrodes 5122. The first stem electrode 5121 may be disposed on only one side surface of the first vibration layer 511 or on a plurality of side surfaces of the first vibration layer 511. The first branch electrodes 5122 may branch from the first stem electrode 5121. The first branch electrodes 5122 may be arranged parallel to each other. In one embodiment, for example, the first stem electrode 5121 may extend in a third direction (Z-axis direction), and the first branch electrodes 5122 may extend in the first direction (X-axis direction) or the second direction (Y-axis direction) from the first stem electrode 5121. The first branch electrodes 5122 may be disposed in the first vibration layer 511 and may be disposed on a lower surface of the first vibration layer 511.

The second electrode 513 may include a second stem electrode 5131 and second branch electrodes 5132. The second stem electrode 5131 may be disposed on another side surface of the first vibration layer 511 or on a plurality of side surfaces of the first vibration layer 511. In this case, the first stem electrode 5121 may be disposed on any one of the side surfaces on which the second stem electrode 5131 is disposed. The second stem electrode 5131 may be disposed on an upper surface of the first vibration layer 511, The first stem electrode 5121 and the second stem electrode 5131 may not overlap each other. The second branch electrodes 5132 may branch from the second stem electrode 5131. The second branch electrodes 5132 may be arranged parallel to each other. In one embodiment, for example, the second stem electrode 5131 may extend in the third direction (Z-axis direction), and the second branch electrodes 5132 may extend in the first direction (X-axis direction) or the second direction (Y-axis direction) from the second stem electrode 5131. The second branch electrodes 5132 may be disposed in the first vibration layer 511 and may be disposed on the lower surface of the first vibration layer 511.

In an embodiment, the first branch electrodes 5122 and the second branch electrodes 5132 may be arranged parallel to each other in the first direction (X-axis direction) or the second direction (Y-axis direction). In such an embodiment, the first branch electrodes 5122 and the second branch electrodes 5132 may be alternately arranged in the third direction (Z-axis direction). In such an embodiment, the first branch electrodes 5122 and the second branch electrodes 5132 may be repeatedly arranged in the third direction (Z-axis direction) in the order of the first branch electrode 5122, the second branch electrode 5132, the first branch electrode 5122, and the second branch electrode 5132.

The first electrode 512 and the second electrode 513 may be electrically connected to leads of the flexible circuit board 580. Therefore, a first driving voltage may be applied to the first electrode 512 from the integrated driver unit 340 of the flexible circuit board 580, and a second driving voltage may be applied to the second electrode 513. The first driving voltage may include the first driving voltage and the first driving voltage, and the second driving voltage may include the second driving voltage and the second driving voltage. The first driving voltage refers to a voltage applied to the first electrode 512, and the second driving voltage refers to a voltage applied to the second electrode 513.

The first vibration layer 511 may include a piezoelectric material that is deformed in response to the first driving voltage applied to the first electrode 512 and the second driving voltage applied to the second electrode 513. The piezoelectric material may be a polyvinylidene fluoride ("PVDF") film, plumbum ziconate titanate ("PZT") or an electroactive polymer.

In an embodiment, the first electrode 512 and the second electrode 513 may include or be made of silver (Ag) having a high melting point or an alloy of Ag and palladium (Pd) since the production temperature of the first vibration layer 511 is high. In such an embodiment, the Ag content may be higher than the Pd content.

The first vibration layer 511 may be disposed between each pair of the first and second branch electrodes 5122 and 5132. The first vibration layer 511 may contract or expand based on a difference between the first driving voltage applied to each first branch electrode 5122 and the second driving voltage applied to a corresponding second branch electrode 5132.

Figure 9A:
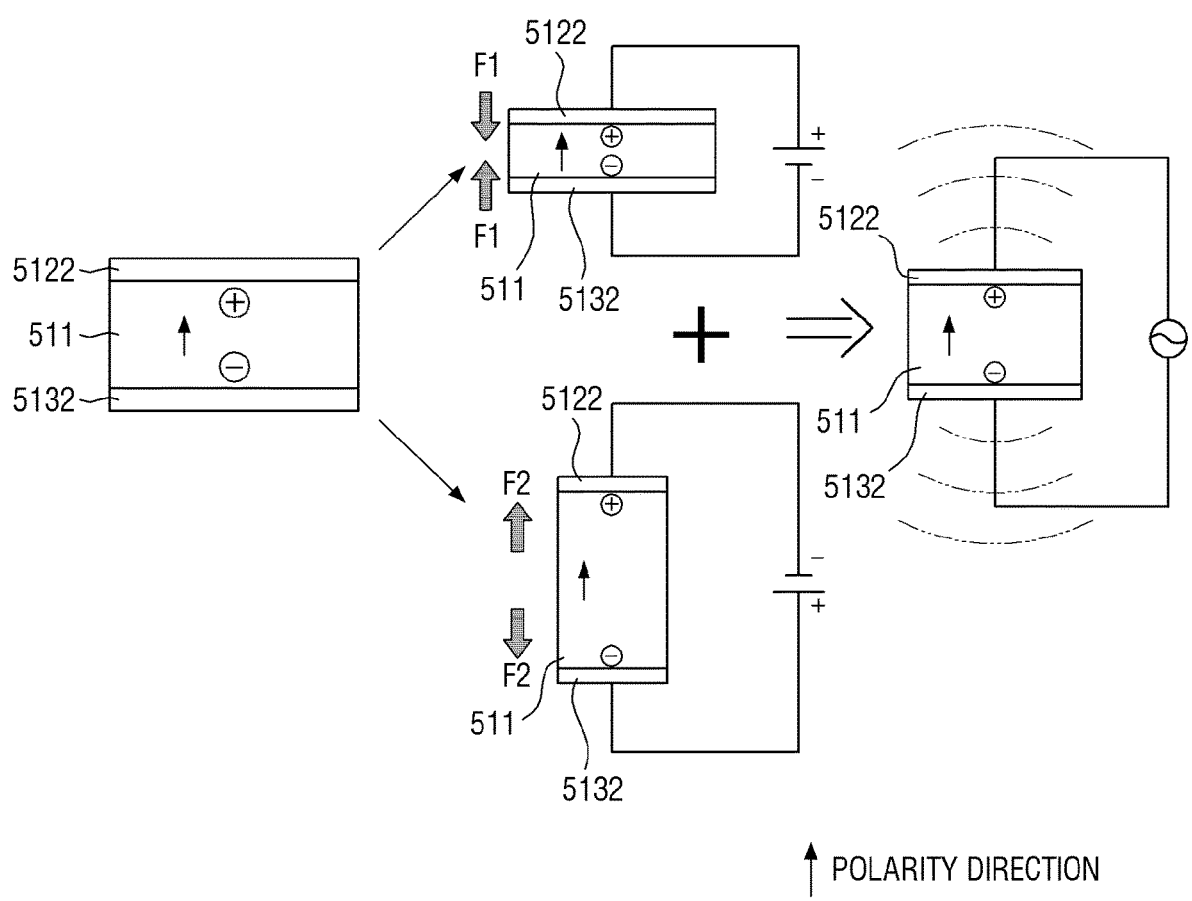
FIG. 9A illustrates a method of vibrating a vibration layer disposed between a first branch electrode and a second branch electrode of the first vibrator.

Specifically, referring to FIG. 9A, when the polarity direction of the first vibration layer 511 disposed between a first branch electrode 5122 and a second branch electrode 5132 disposed under the first branch electrode 5122 is an upward direction (↑), the first vibration layer 511 has a positive polarity in an upper area adjacent to the first branch electrode 5122 and a negative polarity in a lower area adjacent to the second branch electrode 5132. When the polarity direction of the first vibration layer 511 disposed between a second branch electrode 5132 and a first branch electrode 5122 disposed under the second branch electrode 5132 is a downward direction (↓), the first vibration layer 511 has a negative polarity in an upper area adjacent to the second branch electrode 5132 and a positive polarity in a lower area adjacent to the first branch electrode 5122. The polarity direction of the first vibration layer 511 may be determined by a poling process of applying an electric field to the first vibration layer 511 using a first branch electrode 5122 and a second branch electrode 5132.

When the polarity direction of the first vibration layer 511 disposed between a first branch electrode 5122 and a second branch electrode 5132 disposed under the first branch electrode 5122 is the upward direction (↑), if the first driving voltage of the positive polarity is applied to the first branch electrode 5122 and the second driving voltage of the negative polarity is applied to the second branch electrode 5132, the first vibration layer 511 may contract according to a first force F1. The first force F1 may be a compressive force. When the polarity direction of the first vibration layer 511 disposed between a first branch electrode 5122 and a second branch electrode 5132 disposed under the first branch electrode 5122 is the upward direction (↑), if the first driving voltage of the negative polarity is applied to the first branch electrode 5122 and the second driving voltage of the positive polarity is applied to the second branch electrode 5132, the first vibration layer 511 may expand according to a second force F2. The second force F2 may be a tensile force.

Similarly, when the polarity direction of the first vibration layer 511 disposed between a second branch electrode 5132 and a first branch electrode 5122 disposed under the second branch electrode 5132 is the downward direction (↓), if the second driving voltage of the positive polarity is applied to the second branch electrode 5132 and the first driving voltage of the negative polarity is applied to the first branch electrode 5122, the first vibration layer 511 may expand according to a tensile force. When the polarity direction of the first vibration layer 511 disposed between a second branch electrode 5132 and a first branch electrode 5122 disposed under the second branch electrode 5132 is the downward direction (↓), if the second driving voltage of the negative polarity is applied to the second branch electrode 5132 and the first driving voltage of the positive polarity is applied to the first branch electrode 5122, the first vibration layer 511 may contract according to a compressive force. The second force F2 may be a compressive force.

According to an embodiment illustrated in FIG. 8, when the first driving voltage applied to the first electrode 512 and the second driving voltage applied to the second electrode 513 repeatedly alternate between the positive polarity and the negative polarity, the first vibration layer 511 may repeatedly contract and expand, thus causing the first vibrator 510 to vibrate.

Figure 9B:
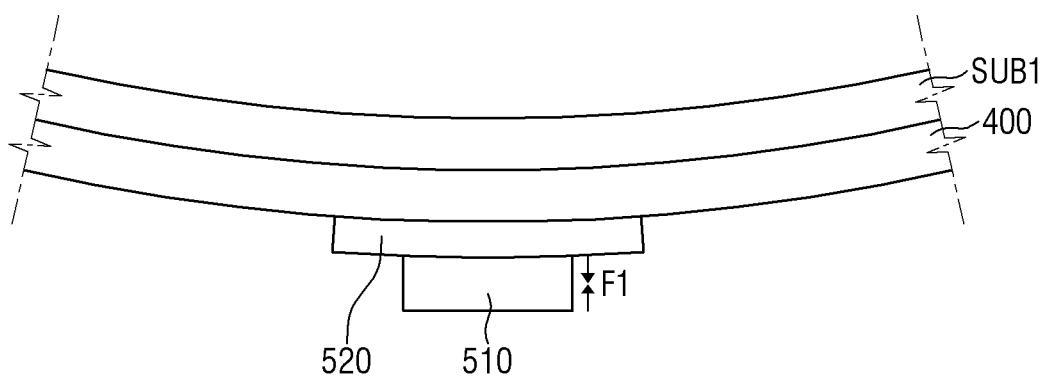
FIGS. 9B and 9C illustrate a method of vibrating the display panel through the vibration of the first vibrator.
Figure 9B:
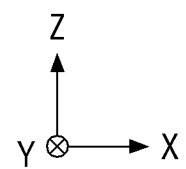

Since the first vibrator 510 is disposed on a surface of the bottom panel member 130, when the first vibration layer 511 of the first vibrator 510 contracts and expands, the display panel 300 may vibrate up and down due to repeated contraction and expansion of the first vibrator 510 as illustrated in FIGS. 9B and 9B. That is, since the display panel 300 is vibrated by the first vibrator 510, the display device 10 may output the first sound.

In an embodiment, as shown in FIG. 8, the fingerprint sensor 520 may include a second vibration layer 521, a third electrode 522, and the fourth electrodes 523.

The third electrode 522 may be disposed under the second vibration layer 521, and the fourth electrodes 523 may be disposed on the second vibration layer 521. The third electrode 522 may extend in the first direction (X-axis direction) and the second direction (Y-axis direction). The fourth electrodes 523 may be spaced apart from each other by predetermined distances in the first direction (X-axis direction) and the second direction (Y-axis direction).

While the first vibrator 510 outputs sound by using the display panel 300 as a diaphragm, the fingerprint sensor 520 emits ultrasonic waves by vibrating in the third frequency band. Therefore, a thickness D1 of the first vibrator 510 may be greater than a thickness D2 of the fingerprint sensor 520.

The third electrode 522 and the fourth electrodes 523 may be electrically connected to leads of the flexible circuit board 580. The fourth electrodes 523 may be commonly connected to one lead of the flexible circuit board 580 or may be connected to leads of the flexible circuit board 580 in a one-to-one correspondence. A third driving voltage may be applied to the third electrode 522 from the integrated driver unit 340 of the flexible circuit board 580, and a fourth driving voltage may be applied to each of the fourth electrodes 523. The third driving voltage may include the third driving voltage and the third driving voltage, and the fourth driving voltage may include the fourth driving voltage. The third driving voltage refers to a voltage applied to the third electrode 522, and the second driving voltage refers to a voltage applied to the fourth electrode 523.

The second vibration layer 521 may include a piezoelectric material that is deformed in response to the third driving voltage applied to the third electrode 522 and the fourth driving voltage applied to the fourth electrodes 523. The piezoelectric material may be a PVDF film or PZT or an electroactive polymer. The second vibration layer 521 may include substantially the same piezoelectric material as the first vibration layer 511.

In an embodiment, the third electrode 522 and the fourth electrodes 523 may be made of Ag having a high melting point or an alloy of Ag and Pd since the production temperature of the second vibration layer 521 is high. In such an embodiment, the Ag content may be higher than the Pd content.

The second vibration layer 521 may be disposed between the third electrode 522 and each of the fourth electrodes 523. The second vibration layer 521 may contract or expand based on a difference between the third driving voltage applied to the third electrode 522 and the fourth driving voltage applied to the fourth electrodes 523.

Figure 9C:
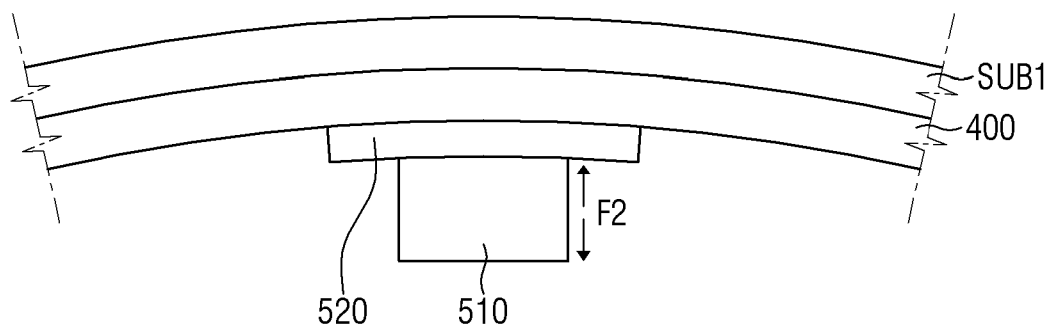
Figure 9C:
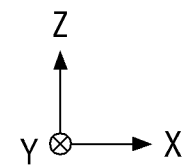

A method of vibrating the second vibration layer 521 by applying the third driving voltage to the third electrode 522 and the fourth driving voltage to the fourth electrodes 523 is substantially the same as the method described above with reference to FIGS. 9A through 9C.

In an embodiment, as show in FIG. 8, the third electrode 522, the fourth electrodes 523, and the second vibration layer 521 disposed between the third electrode 522 and the fourth electrodes 523 may collectively define a single piezoelectric sensor. The larger the number of piezoelectric sensors, the greater the accuracy of fingerprint recognition. However, the larger the number of piezoelectric sensors, the more difficult the process of manufacturing the fingerprint sensor 520. Therefore, the number of piezoelectric sensors of the fingerprint sensor 520 may be appropriately determined in consideration of the accuracy of fingerprint recognition and the difficulty of the manufacturing process.

In the fingerprint sensor 520, electrical signals may be generated in the fourth electrodes 523 of a plurality of piezoelectric sensors according to ultrasonic waves reflected by ridges and valleys of a user's fingerprint due to piezoelectric materials of the second vibration layers 521 of the piezoelectric sensors. The integrated driver unit 340 may sense the electrical signals, e.g., sensing voltages from the fourth electrodes 523 of the fingerprint sensor 520. The integrated driver unit 340 may convert the sensing voltages into sensing data which is digital data and output the sensing data to the main processor 710. The main processor 710 may generate a fingerprint pattern by analyzing the sensing data and determine whether the recognized fingerprint pattern matches a fingerprint pattern stored in advance in the memory.

A first adhesive layer 610 may be disposed between the first vibrator 510 and the fingerprint sensor 520. A surface of the first vibrator 510 and a surface of the fingerprint sensor 520 which face each other may be bonded together by the first adhesive layer 610. The first adhesive layer 610 may be a PSA.

In an embodiment, a protective member may be disposed to surround lower and side surfaces of the first vibrator 510 and side surfaces of the fingerprint sensor 520 to protect the first vibrator 510 and the fingerprint sensor 520.

According to an embodiment, as illustrated in FIG. 8, the fingerprint sensor 520 and the first vibrator 510 are disposed on a surface of the display panel 300 to overlap each other in the thickness direction of the display panel 300. Therefore, in such an embodiment, the space in which the fingerprint sensor 520 and the first vibrator 510 are disposed may be minimized.

Figure 10:
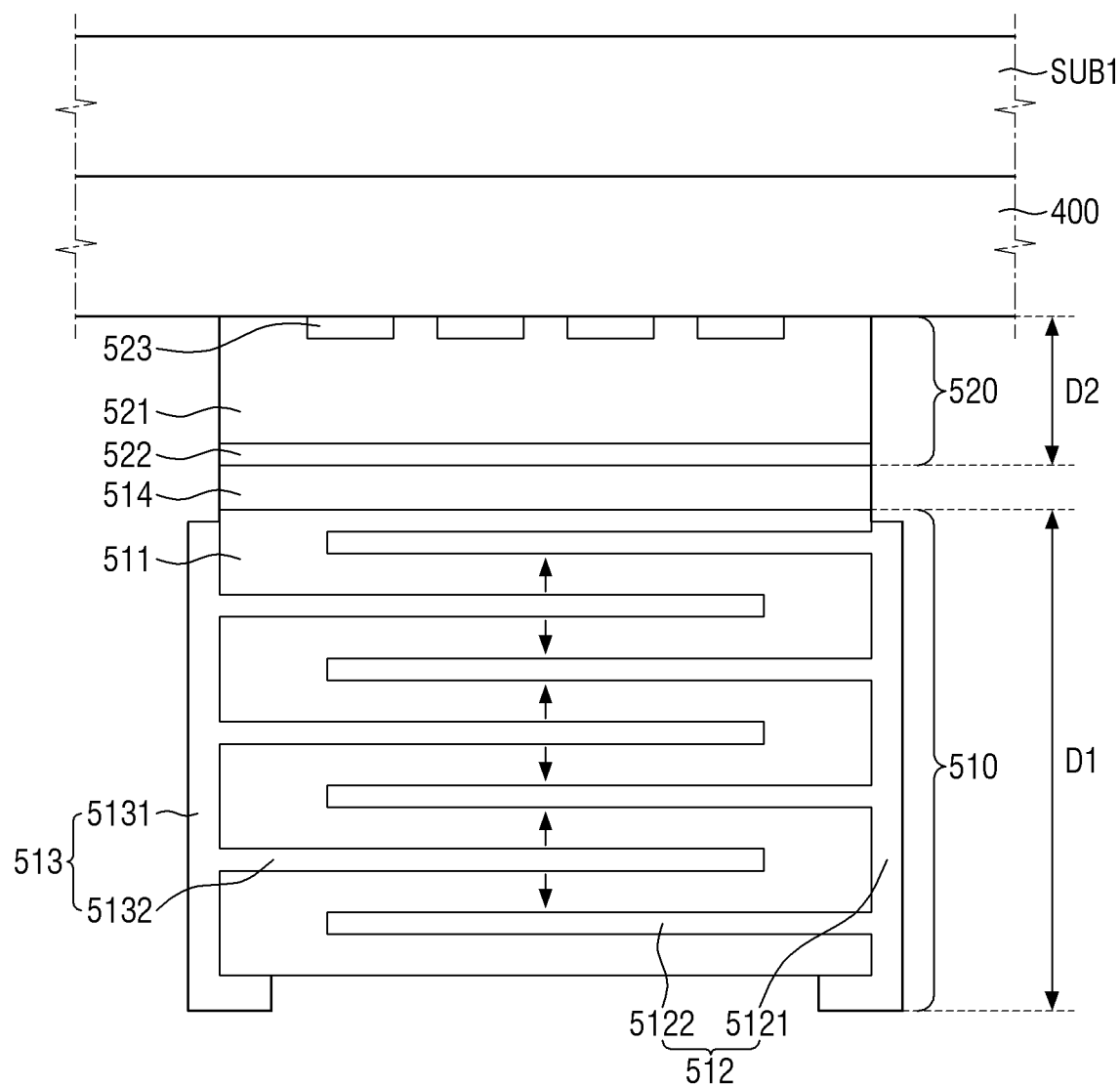
FIG. 10 is a schematic cross-sectional view of an alternative embodiment of the fingerprint sensor and the first vibrator of FIG. 7.

FIG. 10 is a schematic cross-sectional view of an alternative embodiment of the fingerprint sensor 520 and the first vibrator 510 of FIG. 7.

The embodiment illustrated in FIG. 10 is substantially the same as the embodiment illustrated in FIG. 7 except that a first vibrator 510 and a fingerprint sensor 520 are integrally connected without being bonded together by the first adhesive layer 610. The same or like elements shown in FIG. 10 have been labeled with the same reference characters as used above to describe the embodiments of FIG. 7, and any repetitive detailed description thereof will hereinafter be omitted or simplified.

Referring to FIG. 10, in an embodiment, a first vibration layer 511 of the first vibrator 510 and a second vibration layer 521 of the fingerprint sensor 520 may be integrally or directly connected to each other. In such an embodiment, a third vibration layer 514 may be disposed between the first vibration layer 511 of the first vibrator 510 and a third electrode 522 of the fingerprint sensor 520. The first vibration layer 511, the second vibration layer 521, and the third vibration layer 514 may include or be made of a same material as each other. In such an embodiment, the first vibrator 510 and the fingerprint sensor 520 may be formed by a same manufacturing process. In an embodiment, the first vibrator 510 and the fingerprint sensor 520 may be integrally formed as a single unitary unit.

According to an embodiment, as illustrated in FIG. 10, the fingerprint sensor 520 and the first vibrator 510 are disposed on a surface of a display panel 300 to overlap each other in the thickness direction of the display panel 300. Therefore, a space in which the fingerprint sensor 520 and the first vibrator 510 are disposed may be minimized.

In such an embodiment, as illustrated in FIG. 10, since the first vibrator 510 and the fingerprint sensor 520 are integrally formed as a single unitary unit, the first vibrator 510 is connected to the fingerprint sensor 520 without an adhesive layer therebetween.

Figure 11:
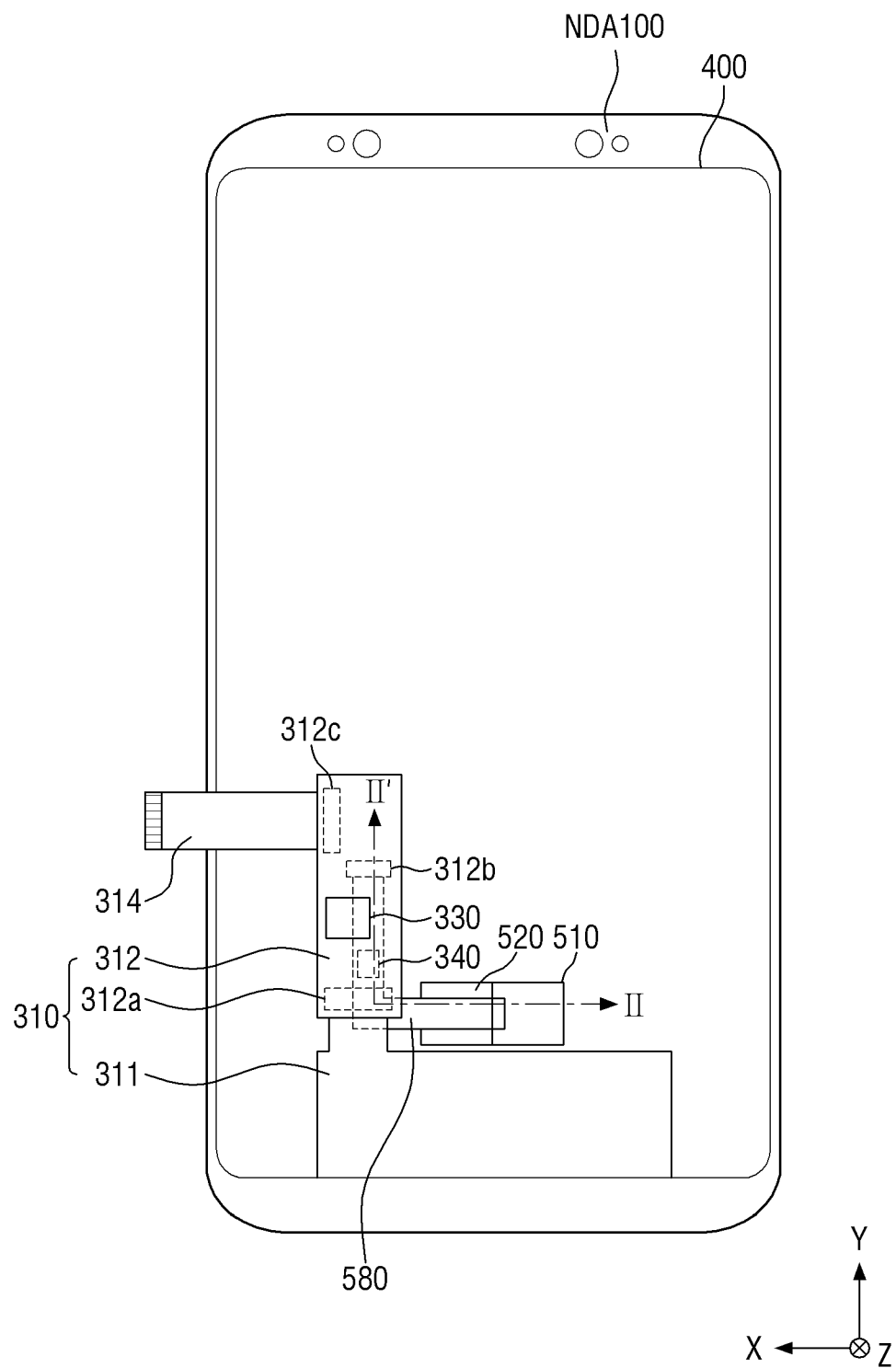
FIG. 11 is a bottom view of an alternative embodiment of the display panel attached to the cover window of FIG. 2.
Figure 12:
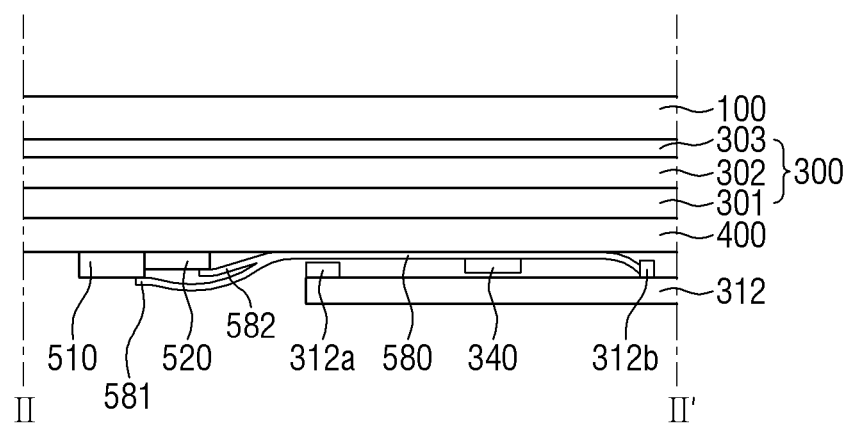
FIG. 12 is a cross-sectional view taken along line II-II' of FIG. 11.
Figure 13:
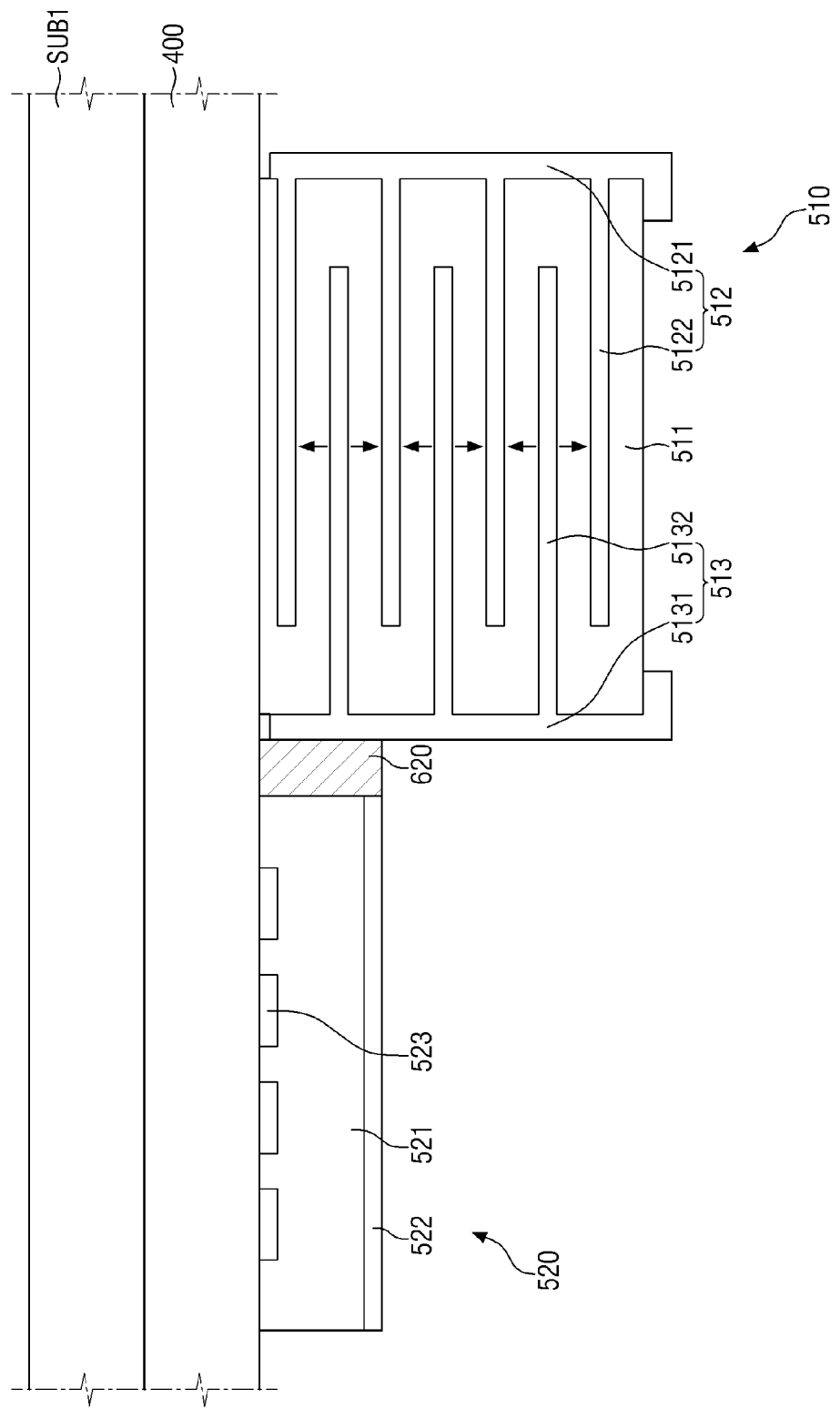
FIG. 13 is a schematic cross-sectional view of an embodiment of a fingerprint sensor and a first vibrator of FIG. 12.

FIG. 11 is a bottom view of an alternative embodiment of the display panel 300 attached to the cover window 100 of FIG. 2. FIG. 12 is a cross-sectional view taken along line II-II' of FIG. 11. FIG. 13 is a schematic cross-sectional view of an embodiment of a fingerprint sensor 520 and a first vibrator 510 of FIG. 12.

The embodiment illustrated in FIGS. 11 through 13 is substantially the same as the embodiment illustrated in FIGS. 1 through 7 except that the first vibrator 510 and the fingerprint sensor 520 neighbor each other in the first direction (X-axis direction) or the second direction (Y-axis direction) without overlapping each other in the third direction (Z-axis direction). The same or like elements shown in FIGS. 11 through 13 have been labeled with the same reference characters as used above to describe the embodiments of FIGS. 1 through 7, and any repetitive detailed description thereof will hereinafter be omitted or simplified.

Referring to FIGS. 11 through 13, the first vibrator 510 and the fingerprint sensor 520 may neighbor each other in the first direction (X-axis direction) or the second direction (Y-axis direction). In an embodiment, the first vibrator 510 is disposed on a right side of the fingerprint sensor 520 as in FIG. 11, but embodiments are not limited to this case. In one alternative embodiment, for example, the first vibrator 510 may be disposed on a left, lower or upper side of the fingerprint sensor 520.

Since the first vibrator 510 is disposed on the right side of the fingerprint sensor 520 as shown in FIGS. 11 and 12, a first pad portion 581 connected to the first vibrator 510 is longer than a second pad portion 582 connected to the fingerprint sensor 520. However, embodiments are not limited thereto. In one embodiment, for example, when the first vibrator 510 is disposed on the left side of the fingerprint sensor 520, the first pad portion 581 connected to the first vibrator 510 may be shorter than the second pad portion 582 connected to the fingerprint sensor 520.

Although the first vibrator 510 and the fingerprint sensor 520 contact each other in the first direction (X-axis direction) or the second direction (Y-axis direction) in FIGS. 11 through 13, embodiments are limited to this case. In one embodiment, for example, the first vibrator 510 and the fingerprint sensor 520 may be spaced apart from each other in the first direction (X-axis direction) or the second direction (Y-axis direction).

A second adhesive layer 620 may be disposed between the first vibrator 510 and the fingerprint sensor 520. A side surface of the first vibrator 510 and a side surface of the fingerprint sensor 520 which face each other may be bonded together by the second adhesive layer 620. The second adhesive layer 620 may be a PSA.

The first vibrator 510 and the fingerprint sensor 520 may also not be bonded together by the second adhesive layer 620. In such an embodiment, a first vibration layer 511 of the first vibrator 510 and a second vibration layer 521 of the fingerprint sensor 520 may be integrally connected to each other. In such an embodiment, the first vibration layer 511 of the first vibrator 510 and the second vibration layer 521 of the fingerprint sensor 520 may include or be made of a same material as each other. In an embodiment, the first vibrator 510 and the fingerprint sensor 520 may be formed by a same manufacturing process. In such an embodiment, the first vibrator 510 and the fingerprint sensor 520 may be integrally formed as a single unitary unit.

According to an embodiment, as illustrated in FIGS. 11 through 13, the fingerprint sensor 520 capable of recognizing a user's fingerprint and the first vibrator 510 capable of outputting sound by vibrating a display panel 300 and providing haptic feedback by generating vibrations are disposed on a surface of the display panel 300. Therefore, in such an embodiment, the user's fingerprint using the fingerprint sensor 520 may be recognized, and sound may be output and haptic feedback may be provided using the first vibrator 510, without being exposed outside. Thus, a call receiver for outputting the other party's voice and a fingerprint sensor for recognizing a user's fingerprint may be removed from the front of a display device, thereby widening a transmissive portion DA100 of a cover window 100. Accordingly, an area where an image is displayed by the display panel 300 may be widened.

Figure 14:
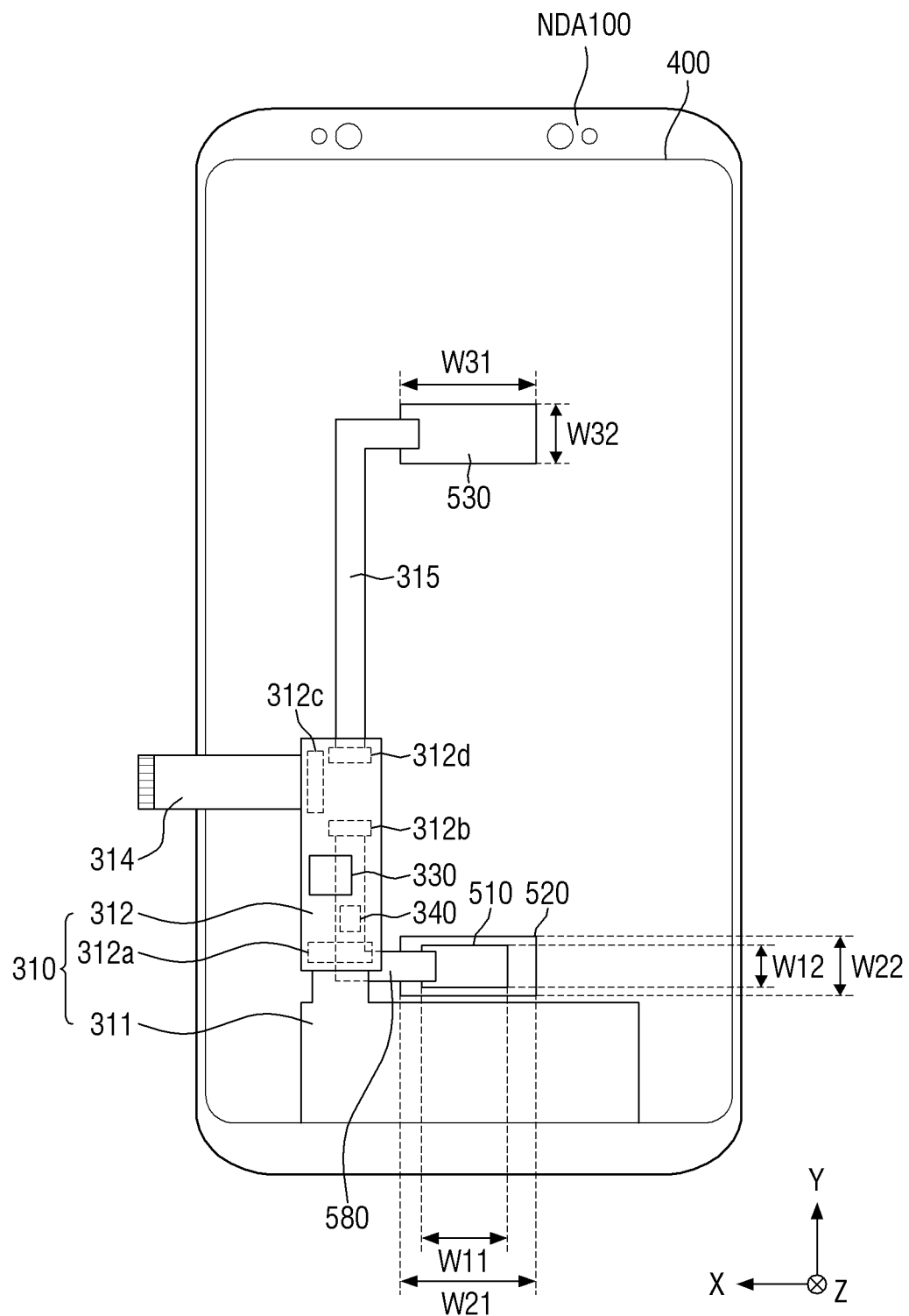
FIG. 14 is a bottom view of another alternative embodiment of the display panel attached to the cover window of FIG. 2.

FIG. 14 is a bottom view of another alternative embodiment of the display panel 300 attached to the cover window 100 of FIG. 2.

The embodiment illustrated in FIG. 14 is substantially the same as the embodiment illustrated in FIG. 4 except that a second vibrator 530 is additionally disposed under a bottom panel member 400. The same or like elements shown in FIG. 14 have been labeled with the same reference characters as used above to describe the embodiments of FIG. 4, and any repetitive detailed description thereof will hereinafter be omitted or simplified.

Referring to FIG. 14, the second vibrator 530 may be attached to the bottom of the bottom panel member 400. The second vibrator 530 may be attached to a lower surface of the bottom panel member 400 by an adhesive member. The adhesive member may be a PSA.

When the second vibrator 530 is disposed on a heat dissipating member of the bottom panel member 400, a first heat dissipating layer or a second heat dissipating layer of the heat dissipating member may be broken by the vibration of the second vibrator 530. Therefore, in an embodiment, the heat dissipating member may be removed from an area where the second vibrator 530 is disposed. In such an embodiment, the second vibrator 530 may be attached to a lower surface of a buffer member. Alternatively, the bottom panel member 400 may be removed from the area where the second vibrator 530 is disposed. In such an embodiment, the second vibrator 530 may be attached to a lower surface of a display panel 300.

A fourth connector 312d of the second circuit board 312 may be connected to an end of a cable 315, and an opposing end of the cable 315 is connected to the second vibrator 530.

The second vibrator 530 may include a second vibration layer having a piezoelectric material that contracts or expands according to driving voltages. In an embodiment, when the second vibrator 530 vibrates in a first frequency band, the display panel 300 may be vibrated by the second vibrator 530, thereby outputting a second sound. When the second vibrator 530 vibrates in a second frequency band, the vibration of the second vibrator 530 may provide haptic feedback to a user.

While a first vibrator 510 is disposed on a surface of a fingerprint sensor 520, the second vibrator 530 is disposed on a surface of the bottom panel member 400. Therefore, a width W31 of the second vibrator 530 in the first direction (X-axis direction) may be greater than a width W11 of the first vibrator 510 in the first direction (X-axis direction). In such an embodiment, a width W32 of the second vibrator 530 in the second direction (Y-axis direction) may be greater than a width W12 of the first vibrator 510 in the second direction (Y-axis direction). In such an embodiment, the second vibrator 530 may be larger than the first vibrator 510. As a vibrator has a larger size, it is easier to realize a low-pitched sound at the time of sound output and easier to implement haptic feedback.

A fundamental frequency (F0) of a first sound output by vibrating the display panel 300 using the first vibrator 510 in the sound mode may be higher than a fundamental frequency (F0) of the second sound output by vibrating the display panel 300 using the second vibrator 530.

In such an embodiment, in the sound mode, a first stereo sound may be output by vibrating the display panel 300 using the first vibrator 510, and a second stereo sound may be output by vibrating the display panel 300 using the second vibrator 530. In this case, a user can hear a 2.0 channel stereo sound. In such an embodiment, the first vibrator 510 may be disposed adjacent to a lower side of the display panel 300, and the second vibrator 530 may be disposed adjacent to an upper side of the display panel 300 as illustrated in FIG. 14 to provide a high-quality stereo sound to a user.

In such an embodiment, in the haptic mode, both the first vibrator 510 and the second vibrator 530 may vibrate to provide haptic feedback, or only the second vibrator 530 may vibrate to provide haptic feedback. Alternatively, in the haptic mode, the first vibrator 510 may vibrate to provide first haptic feedback, and the second vibrator 530 may vibrate to provide second haptic feedback. The vibration magnitude of the second haptic feedback may be greater than that of the first haptic feedback.

The second vibrator 530 may be substantially the same as the first vibrator 510 described above with reference to FIGS. 7 and 8A through 8C, and thus any repetitive detailed description of the detailed structure of the second vibrator 530 will be omitted.

According to an embodiment, as illustrated in FIG. 14, the second vibrator 530 is additionally disposed under the bottom panel member 400, such that the second sound may be output by vibrating the display panel 300 using the second vibrator 530, and haptic feedback may be provided to a user through the vibration of the second vibrator 530. Therefore, the display panel 300 may provide stereo sound in the sound mode, and various haptic feedback in the haptic mode to a user.

Figure 15:
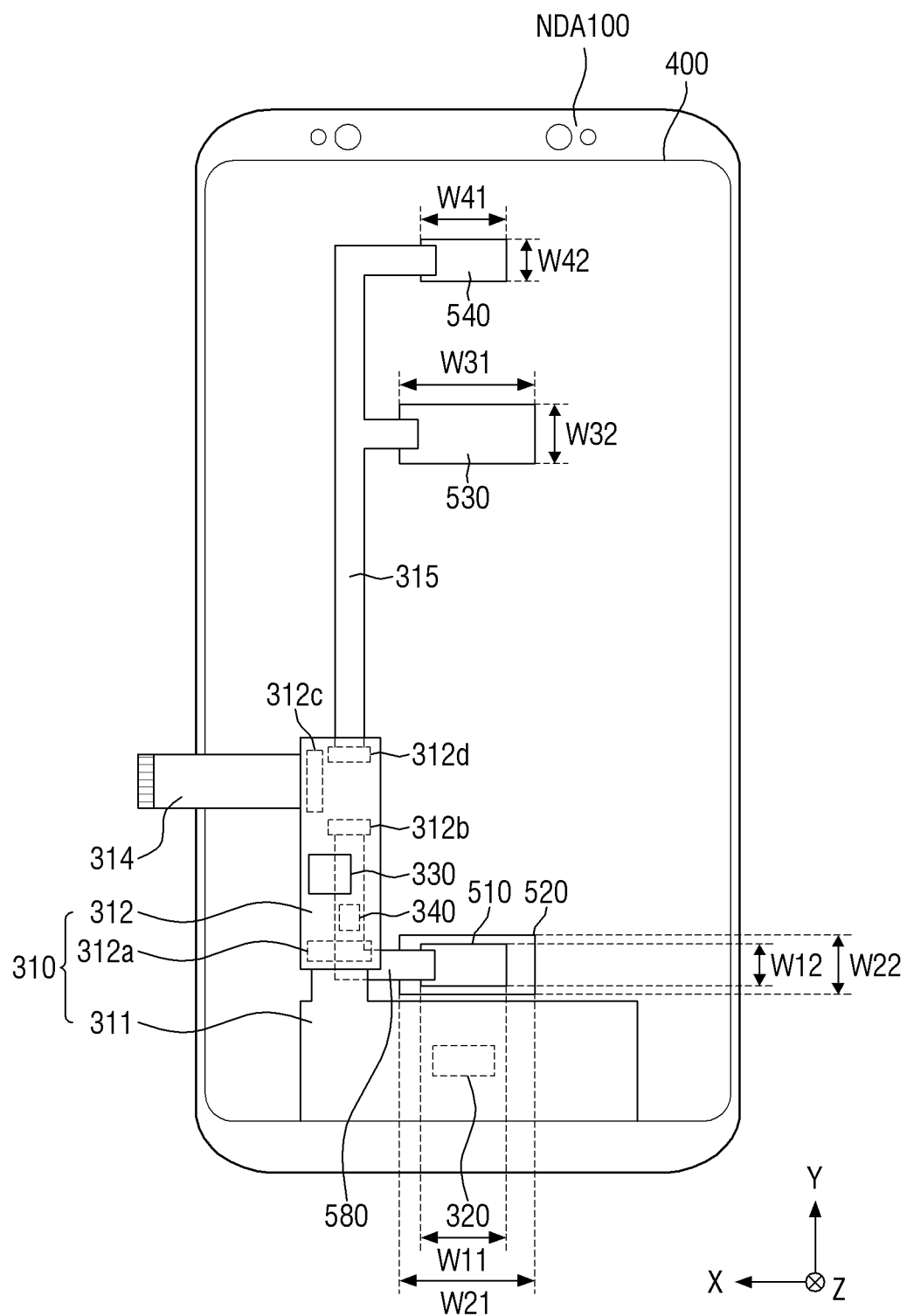
FIG. 15 is a bottom view of another alternative embodiment of the display panel attached to the cover window of FIG. 2.

FIG. 15 is a bottom view of another alternative embodiment of the display panel 300 attached to the cover window 100 of FIG. 2.

The embodiment illustrated in FIG. 15 is substantially the same as the embodiment illustrated in FIG. 14 except that a third vibrator 540 is additionally disposed under a bottom panel member 400. The same or like elements shown in FIG. 15 have been labeled with the same reference characters as used above to describe the embodiments of FIG. 14, and any repetitive detailed description thereof will hereinafter be omitted or simplified.

Referring to FIG. 15, the third vibrator 540 may be attached to the bottom of the bottom panel member 400. The third vibrator 540 may be attached to a lower surface of the bottom panel member 400 by an adhesive member. The adhesive member may be a PSA.

When the third vibrator 540 is disposed on a heat dissipating member of the bottom panel member 400, a first heat dissipating layer or a second heat dissipating layer of the heat dissipating member may be broken by the vibration of the third vibrator 540. Therefore, in an embodiment, the heat dissipating member may be removed from an area where the third vibrator 540 is disposed. In such an embodiment, the third vibrator 540 may be attached to a lower surface of a buffer member. Alternatively, the bottom panel member 400 may be removed from the area where the third vibrator 540 is disposed. In such an embodiment, the third vibrator 540 may be attached to a lower surface of a display panel 300.

The third vibrator 540 may include a third vibration layer having a piezoelectric material that contracts or expands according to driving voltages applied thereto. In such an embodiment, when the third vibrator 540 vibrates in a first frequency band, the display panel 300 may be vibrated by the third vibrator 540, thereby outputting a third sound. When the third vibrator 540 vibrates in a second frequency band, the vibration of the third vibrator 540 may provide haptic feedback to a user.

A width W41 of the third vibrator 540 in the first direction (X-axis direction) may be smaller than a width W31 of a second vibrator 530 in the first direction (X-axis direction). A width W42 of the third vibrator 540 in the second direction (Y-axis direction) may be smaller than a width W32 of the second vibrator 530 in the second direction (Y-axis direction). In such an embodiment, the third vibrator 540 may be smaller than the second vibrator 530. In one embodiment, for example, the third vibrator 540 may have the same or similar size as a first vibrator 510.

A fundamental frequency (F0) of the third sound output by vibrating the display panel 300 using the third vibrator 540 in the sound mode may be higher than a fundamental frequency (F0) of a second sound output by vibrating the display panel 300 using the second vibrator 530.

In such an embodiment, in the sound mode, a low-pitched sound may be output by vibrating the display panel 300 using the first vibrator 510, a first stereo sound may be output by vibrating the display panel 300 using the third vibrator 540, and a second stereo sound may be output by vibrating the display panel 300 using the second vibrator 530. In this case, a user can hear a 2.0 channel stereo sound. In order to provide a high-quality stereo sound to a user, the first vibrator 510 may be disposed adjacent to a lower side of the display panel 300, the third vibrator 540 may be disposed adjacent to an upper side of the display panel 300, and the second vibrator 530 may be disposed between the first vibrator 510 and the third vibrator 540 as illustrated in FIG. 15.

In such an embodiment, in the haptic mode, all of the first vibrator 510, the second vibrator 530, and the third vibrator 540 may vibrate to provide haptic feedback, or only the second vibrator 530 may vibrate to provide haptic feedback. Alternatively, in the haptic mode, the first vibrator 510 may vibrate to provide first haptic feedback, the second vibrator 530 may vibrate to provide second haptic feedback, and the third vibrator 540 may vibrate to provide third haptic feedback. The vibration magnitude of the second haptic feedback may be greater than that of the third haptic feedback.

The third vibrator 540 may be substantially the same as the first vibrator 510 described above with reference to FIGS. 7 and 8A through 8C, and thus any repetitive detailed description of the detailed structure of the third vibrator 540 will be omitted.

According to an embodiment, as illustrated in FIG. 15, the third vibrator 540 is additionally disposed under the bottom panel member 400, such that the third sound may be output by vibrating the display panel 300 using the third vibrator 540, and haptic feedback may be provided to a user through the vibration of the third vibrator 540. Therefore, the display panel 300 may provide stereo sound in the sound mode, and various haptic feedback in the haptic mode to a user.

Figure 16:
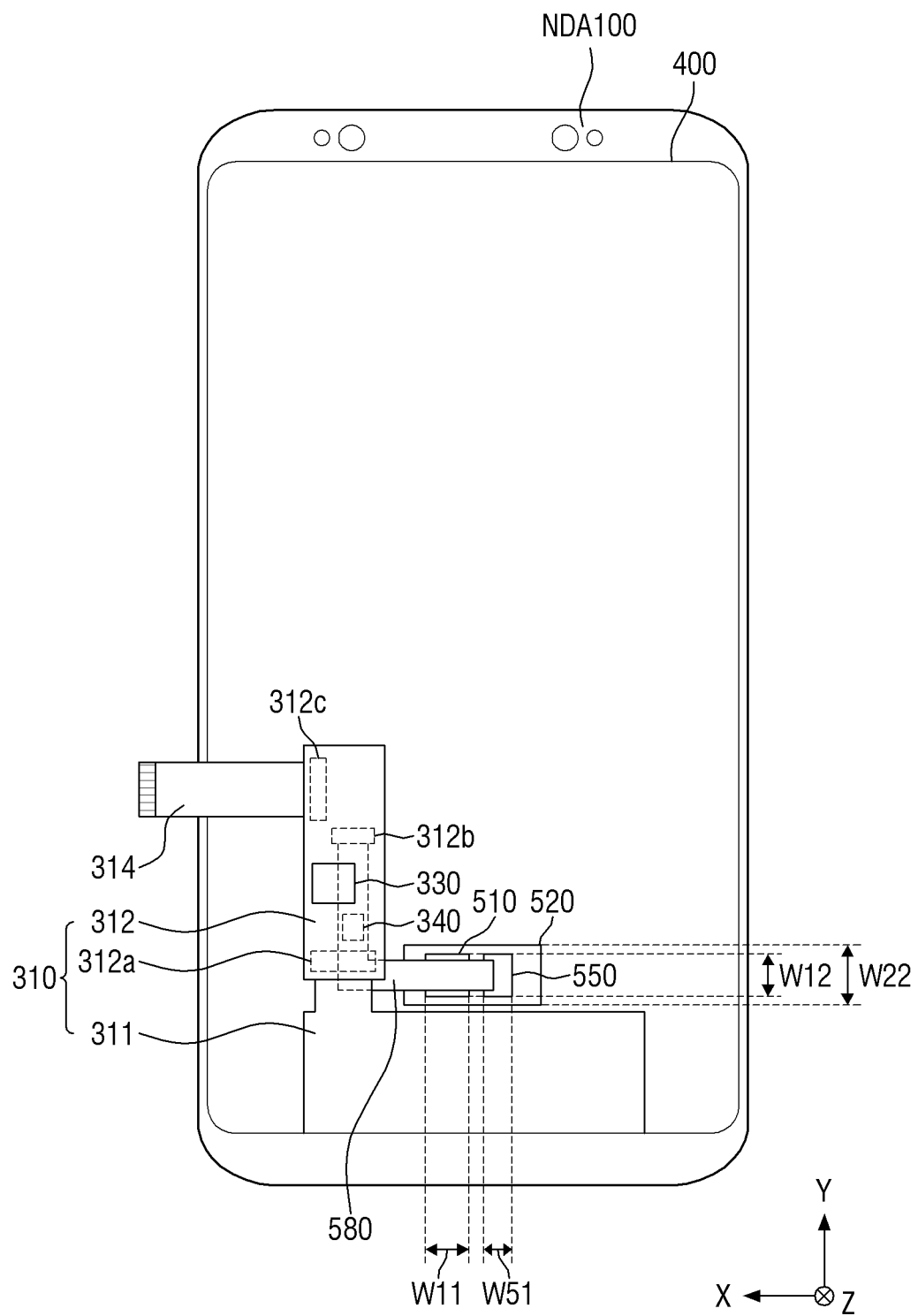
FIG. 16 is a bottom view of another alternative embodiment of the display panel attached to the cover window of FIG. 2.

FIG. 16 is a bottom view of another alternative embodiment of the display panel 300 attached to the cover window 100 of FIG. 2.

The embodiment illustrated in FIG. 16 is substantially the same as the embodiment illustrated in FIG. 4 except that a fourth vibrator 550 is additionally disposed on a fingerprint sensor 520. The same or like elements shown in FIG. 16 have been labeled with the same reference characters as used above to describe the embodiments of FIG. 4, and any repetitive detailed description thereof will hereinafter be omitted or simplified.

Referring to FIG. 16, a first vibrator 510 and the fourth vibrator 550 may be disposed on the fingerprint sensor 520. The first vibrator 510 and the fourth vibrator 550 may be attached onto the fingerprint sensor 520 by a first adhesive layer 610 as illustrated in FIG. 8. Alternatively, the first vibrator 510 and the fourth vibrator 550 may be integrally formed as a single unitary unit as illustrated in FIG. 10.

The fourth vibrator 550 may include a fourth vibration layer having a piezoelectric material that contracts or expands according to driving voltages applied thereto. In such an embodiment, when the fourth vibrator 550 vibrates in a first frequency band, a display panel 300 may be vibrated by the fourth vibrator 550, thereby outputting a fourth sound. When the fourth vibrator 550 vibrates in a second frequency band, the vibration of the fourth vibrator 550 may provide haptic feedback to a user.

The fourth vibrator 550 may be smaller than the first vibrator 510. In one embodiment, for example, as illustrated in FIG. 16, a width W51 of the fourth vibrator 550 in the first direction (X-axis direction) may be smaller than a width W11 of the first vibrator 510 in the first direction (X-axis direction). Alternatively, a width of the fourth vibrator 550 in the second direction (Y-axis direction) may be smaller than a width of the first vibrator 510 in the second direction (Y-axis direction). However, embodiments are not limited thereto, and the first vibrator 510 and the fourth vibrator 550 may also have substantially a same as or similar size to each other.

In the sound mode, a first stereo sound may be output by vibrating the display panel 300 using the first vibrator 510, and a second stereo sound may be output by vibrating the display panel 300 using a fourth vibrator 550. In this case, a user can hear a 2.0 channel stereo sound.

In such an embodiment, in the haptic mode, both the first vibrator 510 and the fourth vibrator 550 may vibrate to provide haptic feedback. Alternatively, in the haptic mode, the first vibrator 510 may vibrate to provide first haptic feedback, and the fourth vibrator 550 may vibrate to provide second haptic feedback. In this case, a vibration pattern of the first haptic feedback may be different from that of the second haptic feedback.

The fourth vibrator 550 may be substantially the same as the first vibrator 510 described above with reference to FIGS. 7 and 8A through 8C, and thus any repetitive detailed description of the detailed structure of the fourth vibrator 550 will be omitted.

According to an embodiment, as illustrated in FIG. 16, the fourth vibrator 550 is additionally disposed under the bottom panel member 400, such that the fourth sound may be output by vibrating the display panel 300 using the fourth vibrator 550, and haptic feedback may be provided to a user through the vibration of the fourth vibrator 550. Therefore, the display panel 300 may provide stereo sound in the sound mode, and various haptic feedback in the haptic mode to a user.

Figure 17:
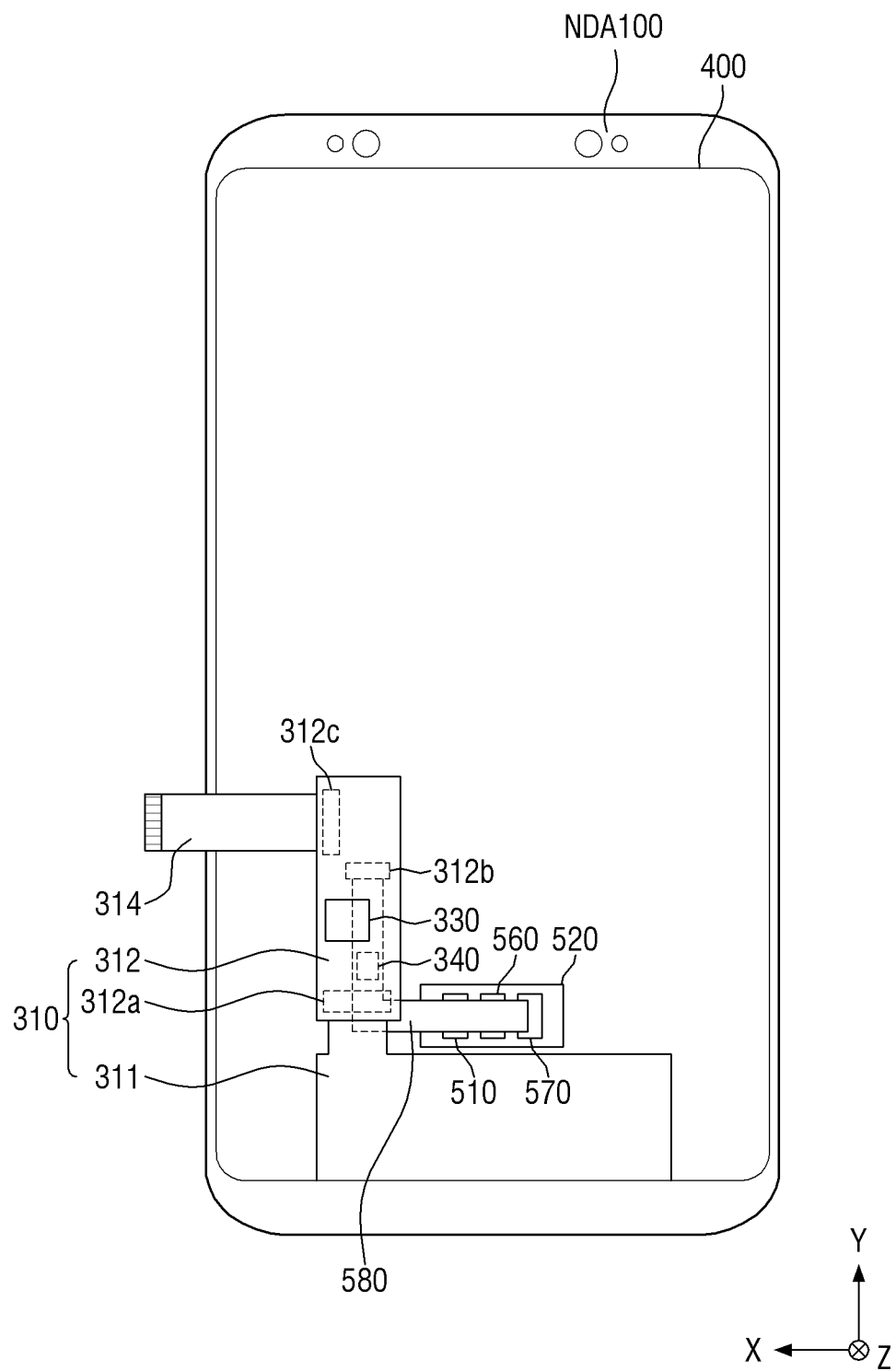
FIG. 17 is a bottom view of another alternative embodiment of the display panel attached to the cover window of FIG. 2.

FIG. 17 is a bottom view of another alternative embodiment of the display panel 300 attached to the cover window 100 of FIG. 2.

The embodiment illustrated in FIG. 17 is different from the embodiment illustrated in FIG. 4 in that a fifth vibrator 560 and a sixth vibrator 570 are additionally disposed on a fingerprint sensor 520. The same or like elements shown in FIG. 15 have been labeled with the same reference characters as used above to describe the embodiments of FIG. 14, and any repetitive detailed description thereof will hereinafter be omitted or simplified.

Referring to FIG. 17, a first vibrator 510, the fifth vibrator 560, and the sixth vibrator 570 may be disposed on the fingerprint sensor 520. The first vibrator 510, the fifth vibrator 560 and the sixth vibrator 570 may be attached onto the fingerprint sensor 520 by a first adhesive layer 610 as illustrated in FIG. 8. Alternatively, the first vibrator 510, the fifth vibrator 560 and the sixth vibrator 570 may be integrally formed as a single piece as illustrated in FIG. 10.

The fifth vibrator 560 may include a fifth vibration layer having a piezoelectric material that contracts or expands according to driving voltages applied thereto. In such an embodiment, when the fifth vibrator 560 vibrates in a first frequency band, a display panel 300 may be vibrated by the fifth vibrator 560, thereby outputting a fifth sound. When the fifth vibrator 560 vibrates in a second frequency band, the vibration of the fifth vibrator 560 may provide haptic feedback to a user.

The sixth vibrator 570 may include a sixth vibration layer having a piezoelectric material that contracts or expands according to driving voltages applied thereto. In such an embodiment, when the sixth vibrator 570 vibrates in the first frequency band, the display panel 300 may be vibrated by the sixth vibrator 570, thereby outputting a sixth sound. When the sixth vibrator 570 vibrates in the second frequency band, the vibration of the sixth vibrator 570 may provide haptic feedback to the user.

The first vibrator 510, the fifth vibrator 560 and the sixth vibrator 570 may have substantially a same size as each other, as illustrated in FIG. 17. However, embodiments are not limited thereto. In one alternative embodiment, for example, the first vibrator 510, the fifth vibrator 560 and the sixth vibrator 570 may have different sizes from each other. Alternatively, at least one of the first vibrator 510, the fifth vibrator 560 and the sixth vibrator 570 may have a different size from the other two.

In the sound mode, a low-pitched sound may be output by vibrating the display panel 300 using one of the first vibrator 510, the fifth vibrator 560 and the sixth vibrator 570, a first stereo sound may be output by vibrating the display panel 300 using another of the first vibrator 510, the fifth vibrator 560 and the sixth vibrator 570, and a second stereo sound may be output by vibrating the display panel 300 using the other one of the first vibrator 510, the fifth vibrator 560 and the sixth vibrator 570. In this case, a user can hear a 2.0 channel stereo sound.

In such an embodiment, in the haptic mode, all of the first vibrator 510, the fifth vibrator 560, and the sixth vibrator 570 may vibrate to provide haptic feedback. Alternatively, in the haptic mode, the first vibrator 510 may vibrate to provide first haptic feedback, the fifth vibrator 560 may vibrate to provide second haptic feedback, and the sixth vibrator 570 may vibrate to provide third haptic feedback. In this case, a vibration pattern of the first haptic feedback, a vibration pattern of the second haptic feedback, and a vibration pattern of the third haptic feedback may be different from each other.

The fifth vibrator 560 and the sixth vibrator 570 may be substantially the same as the first vibrator 510 described above with reference to FIGS. 7 and 8A through 8C, and thus any repetitive detailed description of the detailed structures of the fifth vibrator 560 and the sixth vibrator 570 will be omitted.

According to an embodiment, as illustrated in FIG. 17, the fifth vibrator 560 is additionally disposed under the bottom panel member 400, such that the fifth sound may be output by vibrating the display panel 300 using the fifth vibrator 560, and haptic feedback may be provided to a user through the vibration of the fifth vibrator 560. In such an embodiment, since the sixth vibrator 570 is additionally disposed under the bottom panel member 400, the sixth sound may be output by vibrating the display panel 300 using the sixth vibrator 570, and haptic feedback can be provided to the user through the vibration of the sixth vibrator 570. Therefore, the display panel 300 may provide stereo sound in the sound mode, and various haptic feedback in the haptic mode to a user.

Figure 18:
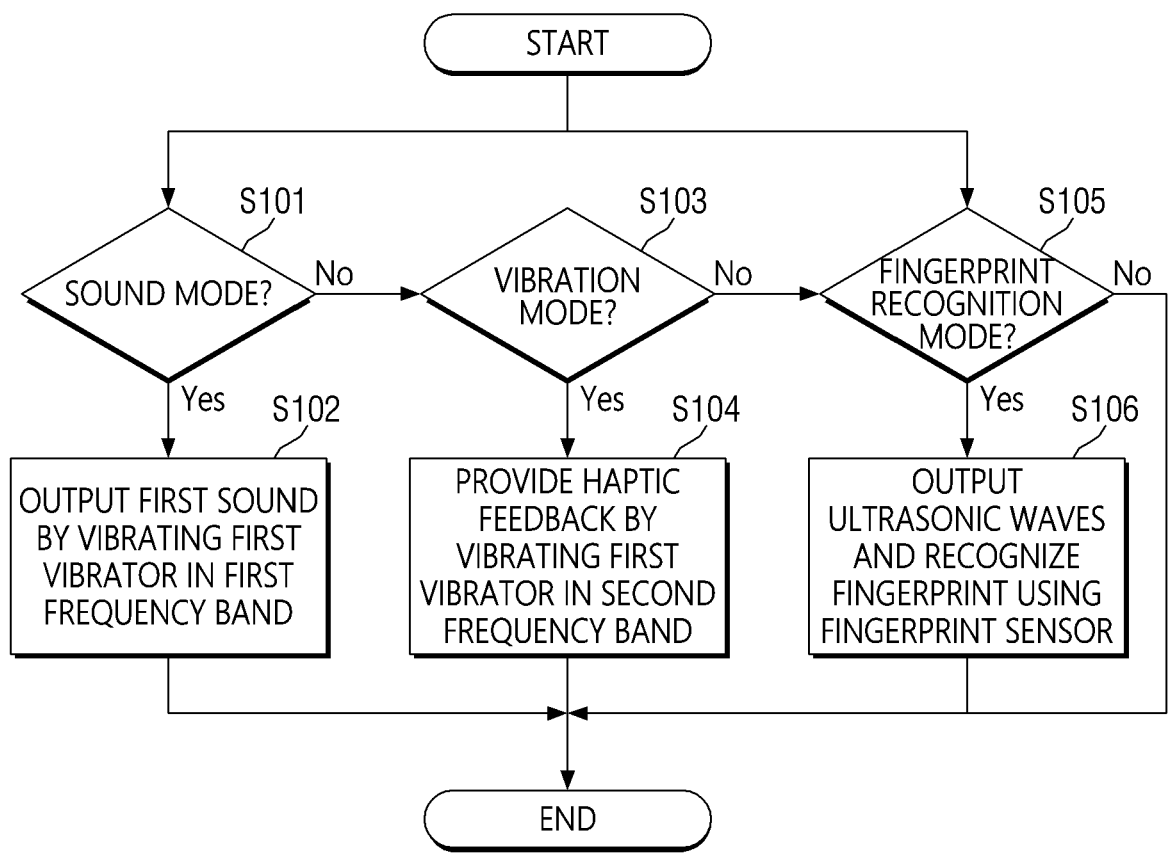
FIG. 18 is a flowchart illustrating a method of driving a display device according to an embodiment.
Figure 19:
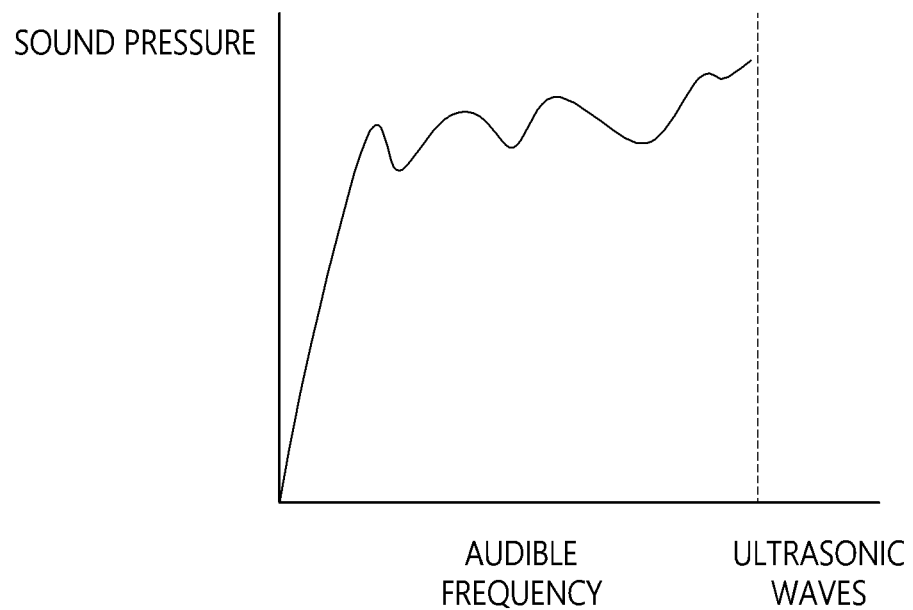
FIG. 19 is a graph illustrating sound pressure characteristics according to the frequency of sound output by a first vibrator in a call mode.
Figure 20:
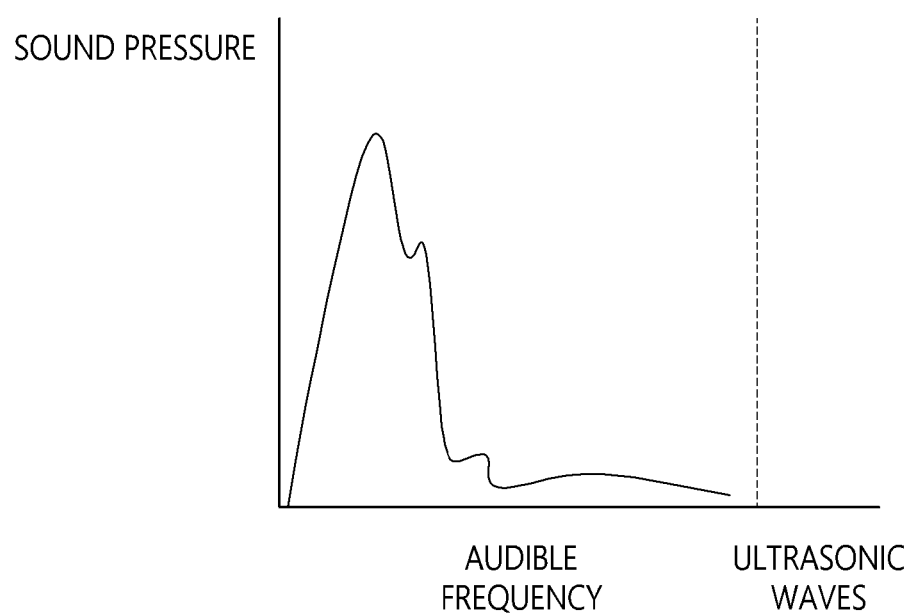
FIG. 20 is a graph illustrating sound pressure characteristics according to the frequency of sound output by the first vibrator in a vibration mode.
Figure 21:
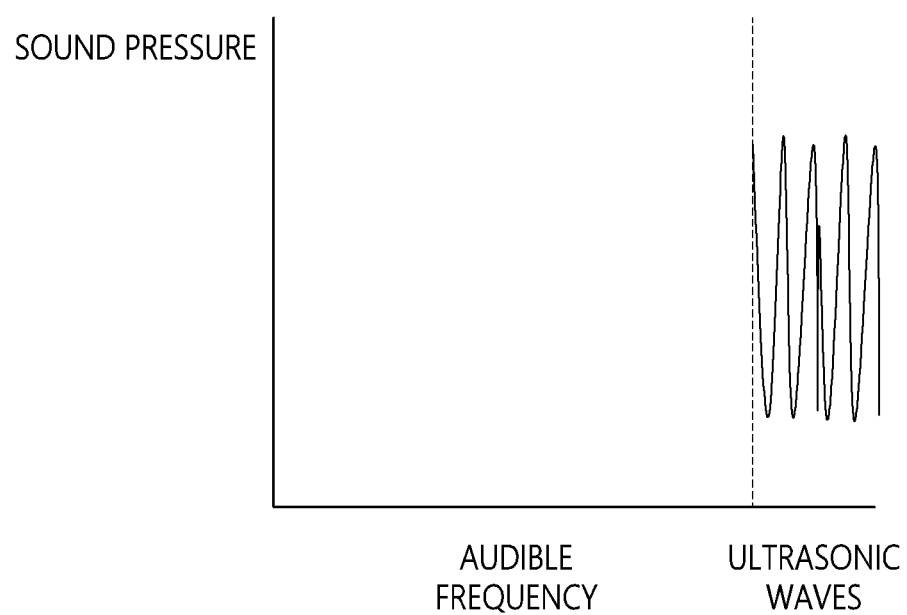
FIG. 21 is a graph illustrating sound pressure characteristics according to the frequency of ultrasonic waves output by a fingerprint sensor in a fingerprint recognition mode.

FIG. 18 is a flowchart illustrating a method of driving a display device according to an embodiment. FIG. 19 is a graph illustrating sound pressure characteristics according to the frequency of sound output by a first vibrator in a call mode. FIG. 20 is a graph illustrating sound pressure characteristics according to the frequency of sound output by the first vibrator in a vibration mode. FIG. 21 is a graph illustrating sound pressure characteristics according to the frequency of ultrasonic waves output by a fingerprint sensor in a fingerprint recognition mode.

Referring to FIG. 18, in an embodiment, when in the sound mode, a display panel 300 is vibrated by vibrating a first vibrator 510 in a first frequency band, thereby outputting a first sound (operations S101 and S102 of FIG. 18).

A main processor 710 outputs first vibration data to an integrated driver unit 340 in the sound mode. The integrated driver unit 340 generates a first driving voltage and a second driving voltage corresponding to the first vibration data and outputs the first driving voltage and the second driving voltage to the first vibrator 510. The first driving voltage is applied to a first electrode 512 of the first vibrator 510, the second driving voltage is applied to a second electrode 513, and the first vibrator 510 may vibrate in response to the first driving voltage and the second driving voltage. Each of the first driving voltage and the second driving voltage may be an alternating current ("AC") voltage having a predetermined period. Accordingly, the first vibrator 510 may vibrate the display panel 300 in the sound mode, thereby outputting the first sound as illustrated in FIG. 19.

In such an embodiment, when in the haptic mode, haptic feedback is provided by vibrating the first vibrator 510 in a second frequency band (operations S103 and S104 of FIG. 18).

The main processor 710 outputs second vibration data to the integrated driver unit 340 in the haptic mode. The integrated driver unit 340 generates a first driving voltage and a second driving voltage corresponding to the second vibration data and outputs the first driving voltage and the second driving voltage to the first vibrator 510. The first driving voltage is applied to the first electrode 512 of the first vibrator 510, the second driving voltage is applied to the second electrode 513, and the first vibrator 510 may vibrate in response to the first driving voltage and the second driving voltage. Each of the first driving voltage and the second driving voltage may be an AC voltage having a predetermined period. By vibrating in the haptic mode, the first vibrator 510 may provide haptic feedback as illustrated in FIG. 20. The AC periods of the first driving voltage and the second driving voltage in the sound mode may be faster than those of the first driving voltage and the second driving voltage in the haptic mode.

In such an embodiment, when in the fingerprint recognition mode, a fingerprint sensor 520 outputs ultrasonic waves and senses the ultrasonic waves reflected by a user's fingerprint, thereby recognizing a user's fingerprint (operations S105 and S106 of FIG. 18).

The main processor 710 outputs third vibration data to the integrated driver unit 340 during a first period of the fingerprint recognition mode. The integrated driver unit 340 generates a third driving voltage and a fourth driving voltage corresponding to the third vibration data during the first period of the fingerprint recognition mode and outputs the third driving voltage and the fourth driving voltage to the fingerprint sensor 520. The third driving voltage is applied to a third electrode 522 of the fingerprint sensor 520, the fourth driving voltage is applied to fourth electrodes 523, and the fingerprint sensor 520 may vibrate in response to the third driving voltage and the fourth driving voltage. The third driving voltage may be an AC voltage having a predetermined period, and the fourth driving voltage may be a ground voltage. Accordingly, in the fingerprint recognition mode, the fingerprint sensor 520 may output ultrasonic waves as illustrated in FIG. 21.

The main processor 710 outputs sensing control data to the integrated driver unit 340 during a second period of the fingerprint recognition mode. The integrated driver unit 340 generates a third driving voltage in response to the sensing control data during the second period of the fingerprint recognition mode and outputs the third driving voltage to the fingerprint sensor 520 and senses electrical signals, that is, sensing voltages from the fourth electrodes 523. The third driving voltage is applied to the third electrode 522 of the fingerprint sensor 520, and a piezoelectric effect of a second vibration layer 521 may occur due to ultrasonic waves reflected by a user's fingerprint. Therefore, the sensing voltages from the fourth electrode 523 may be sensed by the integrated driver unit 340. The third driving voltage maybe a common voltage.

The integrated driver unit 340 may convert the sensing voltages from the fourth electrodes 523 into sensing data, which is digital data, and output the sensing data to the main processor 710. The main processor 710 may generate a fingerprint pattern by analyzing the sensing data and determine whether the recognized fingerprint pattern matches a fingerprint pattern stored in advance in a memory.

According to an embodiment illustrated, as shown in FIG. 18, it is possible not only to recognize a user's fingerprint using the fingerprint sensor 520, but also to output sound and provide haptic feedback using the first vibrator 510, which may not be exposed to an outside as described above. Thus, a call receiver for outputting the other party's voice and a fingerprint sensor for recognizing a user's fingerprint can be removed from the front of a display device, thereby widening a transmissive portion DA100 of a cover window 100. Accordingly, an area where an image is displayed by the display panel 300 can be widened.

Figure 22:
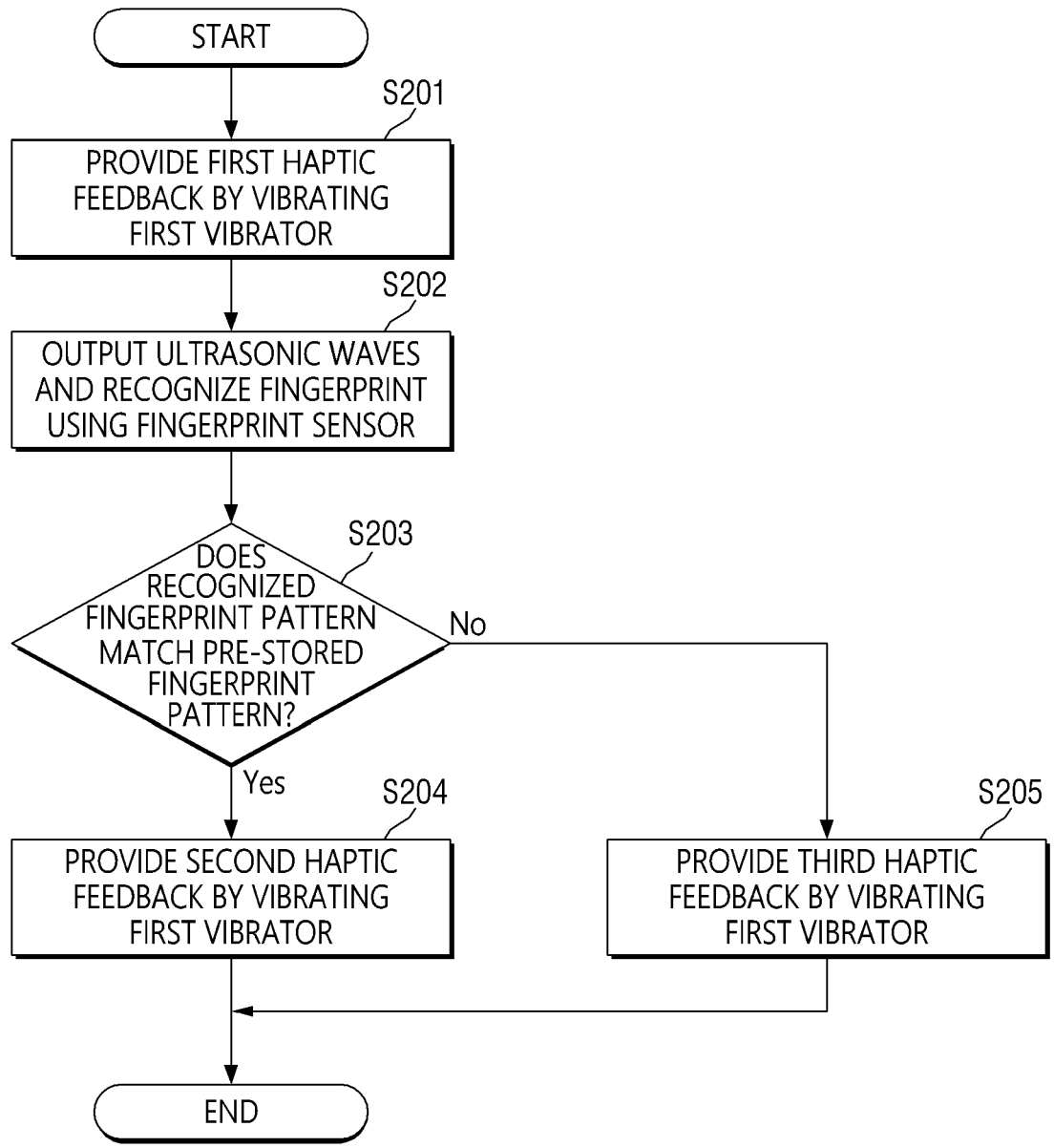
FIG. 22 is a flowchart illustrating a method of driving a display device according to an embodiment.

FIG. 22 is a flowchart illustrating a method of driving a display device according to an embodiment. an alternative embodiment of the fingerprint recognition mode of FIG. 18 is illustrated in FIG. 22.

Referring to FIG. 22, in an embodiment, a first haptic is provided by vibrating a first vibrator 510 before a user's fingerprint is recognized using a fingerprint sensor 520 (operation S201 of FIG. 22).

Operation S201 of FIG. 22 is substantially the same as operations S103 and S104 of FIG. 18, and thus any repetitive detailed description thereof will be omitted.

In such an embodiment, the fingerprint sensor 520 outputs ultrasonic waves and recognizes the user's fingerprint by sensing the ultrasonic waves reflected by the user's fingerprint (operation S202 of FIG. 22).

Operation S202 of FIG. 22 is substantially the same as operations S105 and S106 of FIG. 18, and thus a detailed description thereof is omitted.

In such an embodiment, it is determined whether a recognized fingerprint pattern matches a fingerprint pattern stored in advance (operation S203 of FIG. 22).

An integrated driver unit 340 may convert sensing voltages from fourth electrodes 523 into sensing data which is digital data and output the sensing data to a main processor 710. The main processor 710 may generate a fingerprint pattern by analyzing the sensing data and determine whether the recognized fingerprint pattern matches a fingerprint pattern stored in advance in a memory.

In such an embodiment, when the recognized fingerprint pattern matches the pre-stored fingerprint pattern, second haptic feedback is provided by vibrating the first vibrator 510 (operation S204 of FIG. 22).

When the recognized fingerprint pattern matches the pre-stored fingerprint pattern, the main processor 710 outputs second vibration data to the integrated driver unit 340. The integrated driver unit 340 generates a first driving voltage and a second driving voltage according to the second vibration data and outputs the first driving voltage and the second driving voltage to the first vibrator 510. The first driving voltage is applied to a first electrode 512 of the first vibrator 510, the second driving voltage is applied to a second electrode 513, and the first vibrator 510 may vibrate according to the first driving voltage and the second driving voltage. Each of the first driving voltage and the second driving voltage may be an AC voltage having a predetermined period. In the haptic mode, the first vibrator 510 may vibrate to provide the second haptic feedback. The vibration intensity and/or vibration pattern of the second haptic feedback may be different from the vibration intensity and/or vibration pattern of the first haptic feedback.

In such an embodiment, when the recognized fingerprint pattern does not match the pre-stored fingerprint pattern, third haptic feedback is provided by vibrating the first vibrator 510 (operation S205 of FIG. 22).

When the recognized fingerprint pattern does not match the pre-stored fingerprint pattern, the main processor 710 outputs second vibration data to the integrated driver unit 340. The integrated driver unit 340 generates a first driving voltage and a second driving voltage according to the second vibration data and outputs the first driving voltage and the second driving voltage to the first vibrator 510. The first driving voltage is applied to the first electrode 512 of the first vibrator 510, the second driving voltage is applied to the second electrode 513, and the first vibrator 510 may vibrate according to the first driving voltage and the second driving voltage. Each of the first driving voltage and the second driving voltage may be an AC voltage having a predetermined period. In the haptic mode, the first vibrator 510 may vibrate to provide the third haptic feedback. The vibration intensity and/or vibration pattern of the third haptic feedback may be different from the vibration intensity and/or vibration pattern of the first haptic feedback and the vibration intensity and/or vibration pattern of the second haptic feedback.

According to an embodiment, as illustrated in FIG. 22, it is possible to inform a user of the start of fingerprint recognition by providing the first haptic feedback before recognizing the user's fingerprint using the fingerprint sensor 520. In such an embodiment, it is possible to inform the user of the end of fingerprint recognition by providing any one of the second haptic feedback and the third haptic feedback to the user according to whether a fingerprint pattern recognized by the fingerprint sensor 520 matches a fingerprint pattern stored in advance.

In embodiments of a display device and a method of driving the display device according to the invention, a fingerprint sensor capable of recognizing a user's fingerprint and a first vibrator capable of outputting sound by vibrating a display panel and providing haptic feedback by generating vibrations are disposed on a surface of the display panel. Therefore, it is possible not only to recognize the user's fingerprint using the fingerprint sensor, but also to output sound and provide haptic feedback using the first vibrator, which is not exposed to an outside. Thus, a call receiver for outputting the other party's voice and a fingerprint sensor for recognizing a user's fingerprint can be removed from the front of the display device, thereby widening a transmissive portion of a cover window. Accordingly, an area where an image is displayed by the display panel can be widened.

In embodiments of a display device and a method of driving the display device according to the invention, a fingerprint sensor and a first vibrator are disposed on a surface of a display panel to overlap each other in the thickness direction of the display panel, such that a space in which the fingerprint sensor and the first vibrator are disposed can be minimized.

In embodiments of a display device and a method of driving the display device according to the invention, a first vibrator and a fingerprint sensor are integrally formed as a single unitary unit, such that the first vibrator and the fingerprint sensor may be attached to each other without using an adhesive layer.

In embodiments of a display device and a method of driving the display device according to invention, it is possible to inform a user of the start of fingerprint recognition by providing first haptic feedback before recognizing the user's fingerprint using a fingerprint sensor. In such embodiments, it is possible to inform the user of the end of fingerprint recognition by providing one of second haptic feedback and third haptic feedback to the user according to whether a fingerprint pattern recognized by the fingerprint sensor matches a fingerprint pattern stored in advance.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to exemplary embodiments thereof, it will be understood by those of ordinary skill in the art that various changes in form and details may be made therein without departing from the spirit or scope of the invention as defined by the following claims.

What is claimed is:

1. A display device comprising:
   a display panel;
   a fingerprint sensor which is disposed on a surface of the display panel and emits ultrasonic waves; and
   a vibration device which is disposed on a surface of the fingerprint sensor and generates vibrations,
   wherein the vibration device includes a first vibration layer, and the fingerprint sensor includes a second vibration layer,
   wherein the vibration device comprises:
      a first electrode to which a first driving voltage is applied; and
      a second electrode to which a second driving voltage is applied, wherein the first vibration layer is disposed between the first electrode and the second electrode,
      wherein the first vibration layer contracts or expands in response to the first driving voltage applied to the first electrode and the second driving voltage applied to the second electrode, and wherein the fingerprint sensor comprises:
a third electrode to which a third driving voltage is applied; and
fourth electrodes to which a fourth driving voltage is applied, wherein the second vibration layer is disposed between the third electrode and the fourth electrodes, wherein the second vibration layer contracts or expands in response to the third driving voltage applied to the third electrode and the fourth driving voltage applied to the fourth electrodes.

2. The display device of claim 1, wherein a width of the vibration device in a first direction is smaller than a width of the fingerprint sensor in the first direction.

3. The display device of claim 2, wherein a width of the vibration device in a second direction crossing the first direction is smaller than a width of the fingerprint sensor in the second direction.

4. The display device of claim 1, wherein a width of the vibration device in a first direction is approximately same as a width of the fingerprint sensor in the first direction.

5. The display device of claim 1, wherein a thickness of the vibration device is larger than a thickness of the fingerprint sensor.

6. The display device of claim 1, further comprising: a first adhesive layer disposed between the first vibration layer and the third electrode.

7. The display device of claim 1, further comprising: a third vibration layer disposed between the first vibration layer and the third electrode.

8. The display device of claim 7, wherein the first vibration layer, the second vibration layer, and the third vibration layer include a same piezoelectric element.

9. A display device comprising:
a display panel;
a fingerprint sensor which is disposed on a surface of the display panel and emits ultrasonic waves;
a vibration device which is disposed on a surface of the fingerprint sensor and generates vibrations; and
a flexible circuit board comprising a first pad portion connected to the vibration device, and a second pad portion connected to the fingerprint sensor, and
wherein the display panel vibrates by the vibrations of the vibration device to generate a sound or provide haptic feedback.

10. The display device of claim 9, wherein the first pad portion and the second pad portion branch from an end of the flexible circuit board.

11. The display device of claim 9, further comprising:
an integrated driver unit which is disposed on the flexible circuit board, applies first and second driving voltages among the driving voltages to the vibration device, applies third and fourth driving voltages to the fingerprint sensor.

12. The display device of claim 11, wherein the integrated driver unit senses sensing voltages applied from the fingerprint sensor based on ultrasonic signals reflected by the fingerprint.

13. The display device of claim 9, further comprising:
a display circuit board connected to pads of the display panel, and
wherein the display circuit board does not overlap the vibration device and the fingerprint sensor in a thickness direction of the display panel.

14. The display device of claim 13, wherein the display circuit board includes a connector connected to another end of the flexible circuit board.

15. A display device comprising:
a display panel;
a fingerprint sensor which is disposed on a surface of the display panel and emits ultrasonic waves; and
a vibration device which is disposed on the surface of the display panel and generates vibrations,
wherein the fingerprint sensor and the vibration device neighbor each other in a first direction, and
wherein the fingerprint sensor does not overlap the vibration device in a thickness direction of the display panel, and
wherein a thickness of the vibration device is larger than a thickness of the fingerprint sensor.

16. The display device of claim 15, further comprising:
a display circuit board connected to pads of the display panel, and
wherein the display circuit board does not overlap the vibration device and the fingerprint sensor in the thickness direction of the display panel.

17. The display device of claim 15, further comprising:
a flexible circuit board comprising:
a first pad portion connected to the vibration device; and
a second pad portion connected to the fingerprint sensor.

18. The display device of claim 15, further comprising:
an adhesive disposed between a side surface of the vibration device and a side surface of the fingerprint sensor.

* * * * *